US011797458B2

(12) United States Patent
Takano et al.

(10) Patent No.: US 11,797,458 B2
(45) Date of Patent: Oct. 24, 2023

(54) TERMINAL MANAGEMENT DEVICE AND TERMINAL DEVICE

(71) Applicant: SONY CORPORATION, Tokyo (JP)

(72) Inventors: Hiroaki Takano, Saitama (JP);
Naoyuki Sato, Tokyo (JP); Katsuyoshi Kanemoto, Chiba (JP); Erika Saito, Tokyo (JP); Hirotaka Suzuki, Kanagawa (JP); Taichi Yuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 823 days.

(21) Appl. No.: 16/477,340

(22) PCT Filed: Oct. 25, 2018

(86) PCT No.: PCT/JP2018/039739
§ 371 (c)(1),
(2) Date: Jul. 11, 2019

(87) PCT Pub. No.: WO2019/123832
PCT Pub. Date: Jun. 27, 2019

(65) Prior Publication Data
US 2019/0377695 A1 Dec. 12, 2019

(30) Foreign Application Priority Data

Dec. 19, 2017 (JP) .................................. 2017-242316

(51) Int. Cl.
*G06F 13/00* (2006.01)
*H04L 67/12* (2022.01)
(Continued)

(52) U.S. Cl.
CPC .............. *G06F 13/00* (2013.01); *H04L 67/12* (2013.01); *H04W 4/50* (2018.02); *H04W 4/70* (2018.02)

(58) Field of Classification Search
CPC .......... H04L 67/12; H04L 47/10; H04W 4/50; H04W 4/70; G06F 13/00
See application file for complete search history.

(56) References Cited

U.S. PATENT DOCUMENTS

| 6,421,354 B1 * | 7/2002 | Godlewski .......... H04L 12/5692 370/466 |
| 2004/0090326 A1 * | 5/2004 | Chin ...................... G08B 25/10 340/539.22 |

(Continued)

FOREIGN PATENT DOCUMENTS

| CN | 105119793 A | * 12/2015 | |
| CN | 105516271 A | * 4/2016 | ......... H04L 67/2833 |

(Continued)

OTHER PUBLICATIONS

Yu et al, FDAC: Toward Fine-Grained Distributed Data Access Control in Wireless Sensor Networks, IEEE Transactions on Parallel and Distributed Systems, vol. 22, No. 4, Apr. 2011 (Year: 2011).*

*Primary Examiner* — David R Lazaro
*Assistant Examiner* — Robert A Shaw
(74) *Attorney, Agent, or Firm* — Paratus Law Group, PLLC

(57) ABSTRACT

An optimal network is constructed in a case in which a plurality of IoT standards or IoT platforms coexist. According to the present disclosure, provided is a terminal management device including a receiving unit that receives, from a terminal that collects information from a sensor, access timing information related to an accessible timing to the terminal and a transmitting unit that transmits the access timing information to a server that searches for the information. With this configuration, it is possible to construct an (Continued)

optimal network in a case in which a plurality of IoT standards or IoT platforms coexist.

18 Claims, 12 Drawing Sheets

(51) Int. Cl.
*H04W 4/50* (2018.01)
*H04W 4/70* (2018.01)

(56) References Cited

U.S. PATENT DOCUMENTS

| | | | |
|---|---|---|---|
| 2011/0205081 A1* | 8/2011 | Chen | H04Q 9/00 342/357.57 |
| 2011/0239011 A1* | 9/2011 | Waris | H04L 67/59 713/323 |
| 2012/0030358 A1* | 2/2012 | MacKenzie | H04W 52/0229 709/226 |
| 2012/0197852 A1* | 8/2012 | Dutta | H04L 67/565 707/E17.005 |
| 2012/0197856 A1* | 8/2012 | Banka | H04L 67/2885 707/706 |
| 2012/0197898 A1* | 8/2012 | Pandey | H04L 67/12 707/741 |
| 2012/0197911 A1* | 8/2012 | Banka | G06F 16/951 707/754 |
| 2013/0012220 A1* | 1/2013 | Waris | H04W 52/0216 455/450 |
| 2014/0047254 A1* | 2/2014 | Ha | G06F 1/3203 713/323 |
| 2015/0036570 A1* | 2/2015 | Jeong | H04W 52/0216 370/311 |
| 2015/0091739 A1* | 4/2015 | Ridley | H04Q 9/00 340/870.03 |
| 2015/0169765 A1* | 6/2015 | Brette | G06F 16/951 707/722 |
| 2015/0295763 A1* | 10/2015 | Yu | H04L 63/02 726/4 |
| 2016/0203234 A1* | 7/2016 | Piccand | H04W 4/70 707/798 |
| 2016/0261481 A1* | 9/2016 | Ogata | G05B 23/0264 |
| 2016/0275190 A1* | 9/2016 | Seed | H04L 67/02 |
| 2016/0286566 A1* | 9/2016 | Itaya | H04W 72/0473 |
| 2016/0345292 A1* | 11/2016 | Ljung | H04W 36/00835 |
| 2017/0006358 A1* | 1/2017 | Kuriyama | G05B 19/0425 |
| 2017/0032040 A1* | 2/2017 | Kaneko | H04L 47/521 |
| 2017/0079056 A1* | 3/2017 | Sakwa | H02J 7/0029 |
| 2017/0108350 A1* | 4/2017 | Nagao | G01D 3/08 |
| 2017/0132853 A1* | 5/2017 | Matos | H04L 67/12 |
| 2017/0188360 A1* | 6/2017 | Yu | H04W 74/02 |
| 2017/0251440 A1* | 8/2017 | Gilson | H04W 52/028 |
| 2017/0251488 A1* | 8/2017 | Urban | H04W 72/1263 |
| 2018/0091777 A1* | 3/2018 | Hildmann | G08G 1/0112 |
| 2018/0239341 A1* | 8/2018 | Moorhouse | G05B 19/4183 |
| 2018/0242058 A1* | 8/2018 | Hayakawa | H04Q 9/02 |
| 2018/0261020 A1* | 9/2018 | Petousis | G07C 5/0841 |
| 2019/0123986 A1* | 4/2019 | Igarashi | G05B 19/4183 |
| 2019/0174511 A1* | 6/2019 | Ramesh | G05D 1/0291 |
| 2021/0409981 A1* | 12/2021 | Yan | H04L 43/024 |

FOREIGN PATENT DOCUMENTS

| | | | | |
|---|---|---|---|---|
| CN | 108810053 A | * | 11/2018 | |
| EP | 1835668 A1 | * | 9/2007 | H04L 43/00 |
| EP | 3043273 A1 | * | 7/2016 | G06F 16/22 |
| EP | 3096582 A1 | | 11/2016 | |
| JP | 2010049560 A | | 3/2010 | |
| JP | 2013521471 A | | 6/2013 | |
| JP | 2016-162294 A | | 9/2016 | |
| JP | 2016163242 A | | 9/2016 | |
| JP | 2016536729 A | | 11/2016 | |
| JP | 2017034307 A | | 2/2017 | |
| KR | 2011002362 A | * | 1/2011 | |
| WO | WO-2011116709 A1 | * | 9/2011 | H04W 4/08 |
| WO | WO-2012103402 A2 | * | 8/2012 | G06F 16/2264 |
| WO | WO-2013136155 A1 | * | 9/2013 | H04L 47/6225 |
| WO | WO-2015061290 A1 | * | 4/2015 | H04W 4/70 |
| WO | WO-2016203543 A1 | * | 12/2016 | |
| WO | WO-2017090306 A1 | * | 6/2017 | |
| WO | WO-2018015990 A1 | * | 1/2018 | G06Q 10/06398 |
| WO | WO-2018207322 A1 | * | 11/2018 | G01D 21/02 |

* cited by examiner

TERMINAL MANAGEMENT DEVICE AND TERMINAL DEVICE

CROSS REFERENCE TO PRIOR APPLICATION

This application is a National Stage Patent Application of PCT International Patent Application No. PCT/JP2018/039739 (filed on Oct. 25, 2018) under 35 U.S.C. § 371, which claims priority to Japanese Patent Application No. 2017-242316 (filed on Dec. 19, 2017), which are all hereby incorporated by reference in their entirety.

TECHNICAL FIELD

The present disclosure relates to a terminal management device and a terminal device.

BACKGROUND ART

Recently, Internet of Things (IoT) has been introduced into the real world. For example, the formation of communities in IoT devices is disclosed in Patent Document 1.

CITATION LIST

Patent Document

Patent Document 1: US Patent Publication No. 2016/0105305

SUMMARY OF THE INVENTION

Problems to be Solved by the Invention

In a future IoT network, a plurality of IoT standards and IoT platforms are anticipated to coexist, but it is desirable to a network that guarantees interconnectivity as much as possible. In the technique disclosed in Patent Document, it is difficult to construct a network that guarantees interconnectivity since it is not assumed that a plurality of IoT standards and IoT platforms coexist.

In this regard, it is desirable to construct an optimal network in a case in which a plurality of IoT standards or IoT platforms coexist.

Solutions to Problems

According to the present disclosure, provided is a terminal management device including a receiving unit that receives, from a terminal that collects information from a sensor, access timing information related to an accessible timing to the terminal and a transmitting unit that transmits the access timing information to a server that searches for the information.

Further, according to the present disclosure, provided is a terminal device including a sensor information acquiring unit that acquires information from a sensor and a transmitting unit that transmits access timing information related to an accessible timing of another device that desires to obtain the information to a terminal management device.

Further, according to the present disclosure, provided is a terminal device including a sensor information acquiring unit that acquires information from a sensor, a transmitting unit that transmits plan information related to a plan for collecting data from the sensor to a terminal management device, in which the plan information is defined by the following table in accordance with a frequency of collecting the information and a timing at which a progress of the collection of the information is uploaded to the terminal management device.

TABLE 1

| Item | Content |
| --- | --- |
| Data collection plan | Information is collected for every x minutes and uploaded when collected for y days (here, x and y are arbitrary values) |

Further, according to the present disclosure, provided is a terminal management device including a receiving unit that receives, from a terminal that collects information from a sensor, plan information related to a plan for collecting the information from the sensor; a data collection state calculating unit that calculates a data collection state in the terminal on a basis of the plan information and a progress of the collection of the information in the terminal; and a transmitting unit that transmits the data collection state to a server that searches for the information.

Further, according to the present disclosure, provided is a terminal device including a sensor information acquiring unit that acquires information from a sensor and a transmitting unit that transmits the information to a terminal management device in accordance with a schedule generated by the terminal management device on a basis of priorities included in information collection requests obtained from a plurality of servers that search for the information.

Further, according to the present disclosure, provided is a terminal management device including a receiving unit that receives information collection requests from a plurality of servers having a search function, a schedule generating unit that generates a schedule for providing information to the plurality of servers on a basis of priorities included in the information collection requests, and a transmitting unit that acquires the information from a terminal that collects the information from the sensor on a basis of the schedule and transmits the information to each of the plurality of servers.

Further, according to the present disclosure, provided is a terminal device including a sensor information acquiring unit that acquires information from a sensor and a transmitting unit that transmits the information to a plurality of servers in accordance with a schedule generated by the terminal management device on a basis of priorities included in information collection requests obtained from a plurality of servers that search for the information.

Further, according to the present disclosure, provided is a terminal management device including a receiving unit that receives information collection requests from a plurality of servers having a search function, a schedule generating unit that generates a schedule for the plurality of servers to acquire the information from a terminal that collects information from a sensor on a basis of priorities included in the information collection requests, and a transmitting unit that transmits the schedule to the plurality of servers.

Further, according to the present disclosure, provided is a terminal device including a sensor information acquiring unit that acquires information from a sensor and a transmitting unit that transmits information commonly included in information collection requests calculated by a terminal management device that receives the information collection requests acquired from a plurality of servers that search for the information to the terminal management device.

Further, according to the present disclosure, provided is a terminal management device including a receiving unit that receives information collection requests from a plurality of servers having a search function, a common part calculating unit that calculates a common part of the information collection requests received from the plurality of servers, and a transmitting unit that acquires data related to the common part from a terminal that collects information from a sensor and transmits the data to each of the plurality of servers.

Further, according to the present disclosure, provided is a terminal device including a sensor information acquiring unit that acquires information from a sensor, a tag information generating unit that generates tag information identifying the information, and a transmitting unit that transmits the tag information to a terminal management device.

Further, according to the present disclosure, provided is a terminal management device including a tag information acquiring unit that acquires tag information identifying information from a terminal that acquires the information from a sensor and a transmitting unit that transmits the tag information to a server that searches for the information.

Further, according to the present disclosure, provided is a terminal management device including a receiving unit that receives an information request for capabilities of the terminal management device related to a terminal that collects information from a sensor from a server having a search function and a transmitting unit that transmits the capabilities related to the terminal defined by the following table to the server in response to the information request.

TABLE 2

| Capability number | 1: Valid 0: Invalid | Content of capability |
|---|---|---|
| 1 | 1/0 | Function of disclosing accessible time of terminal |
| 2 | 1/0 | Function of notifying of accessible time for each priority of terminal |
| 3 | 1/0 | Function of disclosing data collection plan information of terminal |
| 4 | 1/0 | Function of disclosing progress of data collection of terminal |
| 5 | 1/0 | Function of adjusting access to terminal for each priority |

Effects of the Invention

As described above, according to the present disclosure, it is possible to construct an optimal network in a case in which a plurality of IoT standards and IoT platforms coexist.

Moreover, the above effect is not necessarily limited, and any of effects described in this specification or other effects that can be understood from this specification may be included in addition to or instead of the above effect.

MODE FOR CARRYING OUT THE INVENTION

Figure 1:
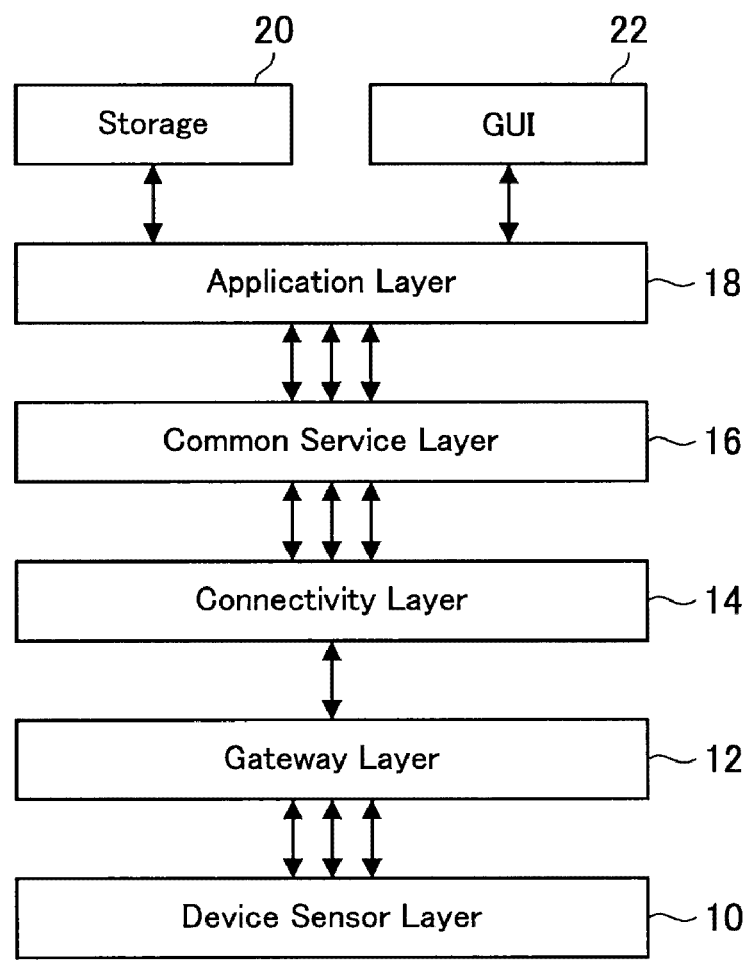
FIG. 1 is a schematic diagram illustrating a layer structure of IoT.

Hereinafter, exemplary embodiments of the present disclosure will be described in detail with reference to the appended drawings.

Moreover, in this specification and the drawings, components having substantially the same functional configuration will be assigned the same reference numerals, and repeated explanation will be omitted.

Moreover, the description will proceed in the following order.

1. Overview of IoT
2. Overview of system according to the present disclosure
3. First Embodiment
4. Second Embodiment
5. Third Embodiment
6. Fourth Embodiment
7. Fifth Embodiment 1. Overview of IoT

[IoT]

Recently, Internet of things (IoT) has been introduced into the real world. IoT is the Internet of Things, and it is a communication system that communicates directly with things unlike communication of smartphones owned by people. Machine type communication (MTC) and machine to machine (M2M) are also terms indicating a communication topology for realizing IoT, and also represent communication forms in which a machine communicates with a machine.

One of features of IoT is that a large number of devices perform communication. For example, if it is assumed that the number of machines related to one human being is 10 to 100 times, machines that perform communication, that is, communication devices which are 10 to 100 times as many as telephones or the like used for communication between human beings are placed in all places.

There are wireless communication and wired communication as communication, but in the case of IoT, it is preferable to use wireless communication. This is because wireless communication has less restrictions on places to place devices.

In order to construct an IoT system, an interface with a sensor, a communication means, an application, a storage, and an interface with a user are generally necessary. As a basic flow, a sensor collects information. The sensor notifies an application on a network side of the information via a communication means such as wireless communication. The application performs analysis or the like on the basis of the collected information, and reports an analysis result in a human-readable form. There are a wide variety of use cases for IoT such as factory management, power management, agriculture, and healthcare. Currently, IoT systems are often considered to be constructed and operated separately for each use case.

Previously, IoT systems were constructed for individual purposes. Such a method is expensive in cost, and there is a demand for a general-purpose IoT system. In this regard, various IoT standards or various IoT platforms are under review. All IoT standards and all IoT platforms have a layer structure of IoT illustrated in FIG. 1.

The layers illustrated in FIG. 1 will be described below in order from a lower layer. A device sensor layer 10 is a layer in which various sensors and actuators are arranged. A gateway layer 12 is a layer that absorbs differences between various devices, and is a layer that aggregates information from various sensors and transfers information to an upper layer. A connectivity layer 14 is a communication layer. This layer can use various communication schemes such as LTE, 3G, GSM (registered trademark), Wi-Fi, Bluetooth (registered trademark), Zigbee, and the like.

A common service layer 16 is a layer that provides functions common to IoT applications, and bridges data between different applications and absorbs differences in different connectivity. Examples of the functions common to IoT applications include functions which are commonly used such as discovery and activation of IoT devices, accounting, setting, and collection of information.

An application layer 18 is a layer that arranges various applications for IoT. For example, each service provider is expected to have various applications. A storage 20 and a GUI 22 are necessary in the application. Content of the storage 20 is expected to be provided to the application as a service via the common service layer. A coordination between applications can be considered to be also performed via the common service layer.

At least the device sensor layer 12, the connectivity layer 14, and the application layer 18 have various schemes, standards, and mechanisms, and thus an interoperability issues arise in exchanging information. In typical IoT systems such as ETSI M2M or One M2M, the gateway layer 12 and the common service layer 16 are prepared to solve this problem. The gateway layer 12 is used as a layer for absorbing differences in standards or differences in systems in order to connect various device sensors and various communication means. The common service layer 16 is used as a layer for absorbing differences in standards or differences in systems in order to connect various applications and various communication means. In other words, the gateway layer 12 and the common service layer 16 are installed as a layer that absorbs differences for interoperability. This method works well when a mechanism such as the gateway layer 12 or the common service layer 16 is prepared in a single standard or platform.

[Coexistence of Plurality of Standards and Platforms]

Figure 2:
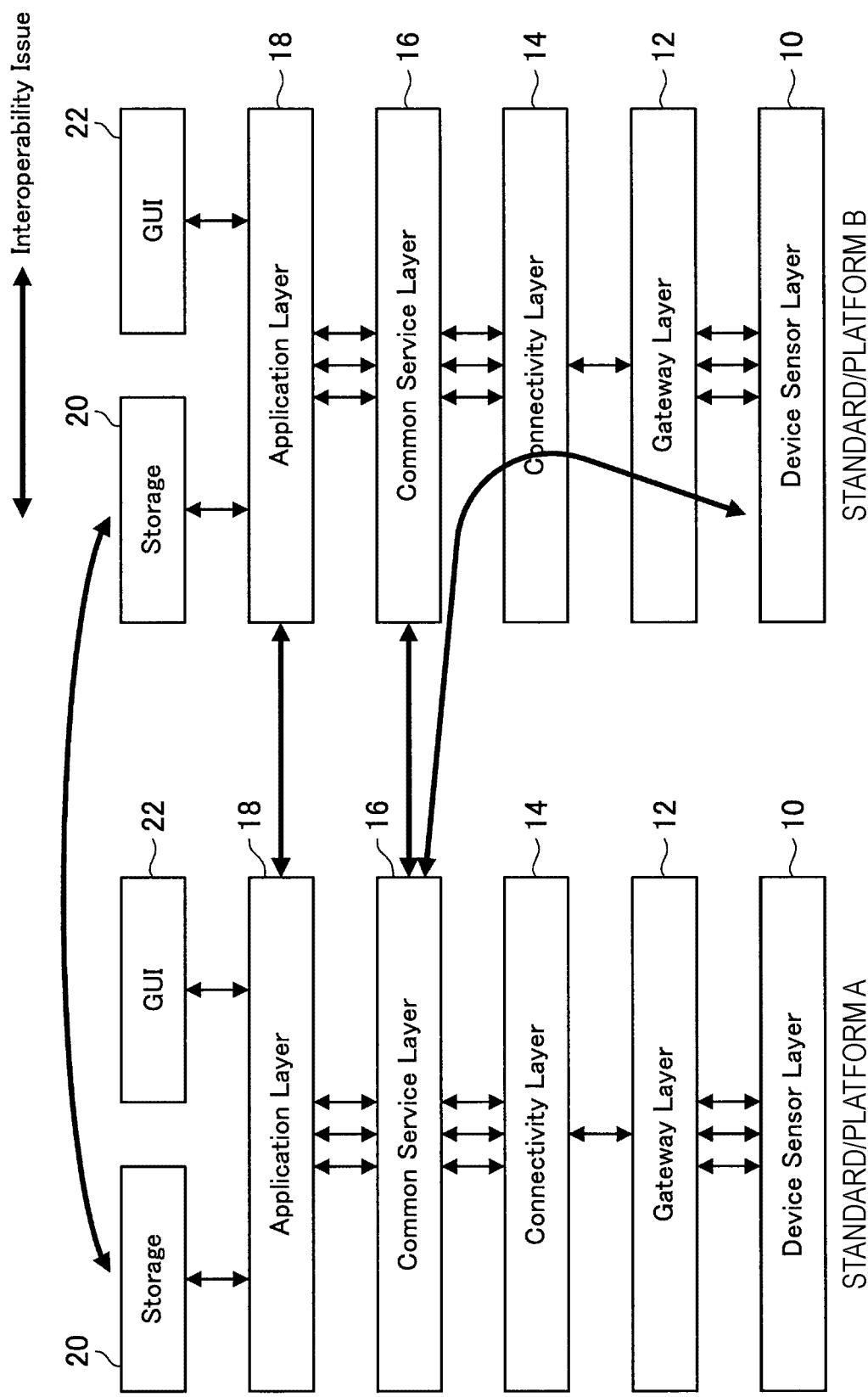
FIG. 2 is a schematic diagram illustrating a case in which an interconnection is unable to be performed in a network in which different IoT standards or different IoT platforms coexist.

As described above, when it operates in a single IoT standard or IoT platform, it is possible to ensure the interoperability of various sensors or applications. However, as illustrated in FIG. 2, in networks in which different IoT standards or IoT platforms co-exist, there are cases in which an interconnection is unable to be performed. FIG. 2 illustrates a case in which one device operates in an IoT standard/IoT platform A, and the other device operates in an IoT standard/IoT platform B. In this case, there are cases in which an interconnection is performed through data format conversion or the like. However, in all cases, the problem is not necessarily solved through the data format conversion. For example, in a case in which hourly data is necessary in an application but a platform can prepare only daily data, an application side is unable to use data even through data conversion is performed.

[Network in which Plurality of Standard/Platforms Coexist]

A future IoT network is expected to be constructed as a network in which a plurality of IoT standards or IoT platforms coexist, and interconnectivity can be guaranteed as much as possible. In such an incomplete network, various constraints may occur. Table 1 shows features of an incomplete network. In the incomplete network, even when an attempt to acquire data is performed, easiness of data access is not uniform.

TABLE 1

| features of incomplete network | | |
|---|---|---|
| | IoT network of related art | Incomplete network |
| Used standard/platform | Only one | Twice or more are mixed |
| Accessibility of data | Uniform | Non-uniform |

[IoT System Constructed for Intended Specific Purpose]

In a case in which a purpose of constructing an IoT system is clear, it is reasonable to construct an IoT system in a single standard and platform. This is because it is possible to construct an optimal system for the intended purpose.

[IoT System Constructed for Unspecified Purpose]

On the other hand, there are events in which a thing desired to be investigated is not known. For example, it is an event in which a thing to be investigated is first found when the user or the like inputs a thing desired to be investigated to a system. For example, it corresponds to "I want to know a probability that Mr. A will have a cold if Mr. A goes to Shinjuku," "Production of wheat this year," "Which vendor can certainly supply a desired amount of parts on time?," and "Where is a travel destination appropriate to my physical condition?."

As described above, in a case in which such a purpose is unable to be determined, it is uncertain whether to get a thing to be desired to be known by a specific IoT search system. In other words, it is unlikely that a response can be obtained by a single IoT search system, and in this case, it is more reasonable to send an inquiry to a plurality of IoT search systems of a plurality of platforms and gets a response. In this case, it is necessary to obtain information from a plurality of IoT search systems on a plurality of standard/platform and get a thing to be desired to be known.

Further, since combinations of inquiries to be searched or the like can be assumed infinitely as in the example described here, it is unknown which inquiry the user asks an incomplete IoT network. An IoT search system which instantly gives a response to an inquiry of the user is expected to be required in the future.

Incidentally, a web search system has permeated the world as a search system. However, the web search system is a system that selects and displays things close to a search word, a search target is a web, and a main target is a language. On the other hand, in the IoT search system, stored data is not language but data which is a bit string. Therefore, in the IoT search system, it is necessary to determine data to be acquired and how to analyze it in order to provide information desired by the user and display them as results.

[Conventional Web Search System]

As described above, the IoT search system is different from the current web search system. Here, a mechanism of the web search system will be described. The biggest feature of the web search system is ranking. The web search system is characterized in displaying web pages related to a search word instantly along with a ranking. The means used for ranking of first-generation web search includes a "page rank," an "anchor text," and a word. The "page rank" is a means of increasing a rank of a popular page. Further, a page with many links is considered to be important.

The "anchor text" is a representative character string among character strings attached to a link. For example, in a case in which there is a link "Here is a new product of a company A," a part "company A" is the anchor text, and the page has a high rank as a page related to the company A. The "word" is a mean of increasing a rank, for example, when a corresponding word is included in a web page many times. Moreover, the above examples are content of the initial web search, and it should be noted that the latest one is more improved.

A second feature of the web search system is advance preparation for giving a response instantly when a search word is input. The advance preparation can be divided into two phases: crawling and indexing. The crawling is a task of collecting content of web pages in advance about web pages in the world. A logical robot called a crawler periodically crawls web pages and the like, collects information, and stores the collected information in a storage called a repository of the web search system. The indexing is a task of organizing collected content of web pages from links, contained character strings, and the like and structuring data so that ranks corresponding to a search word are easily output.

Figure 3:
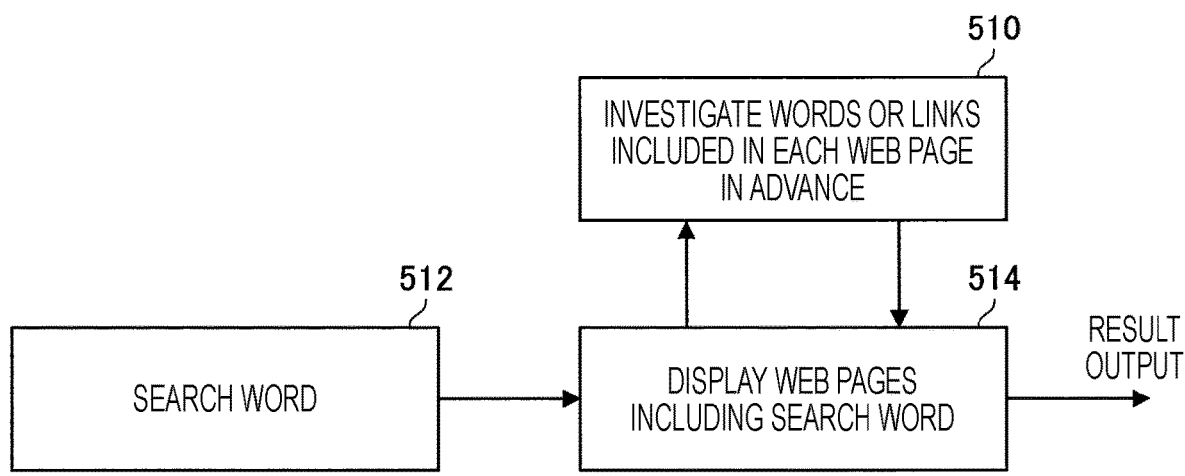
FIG. 3 is a schematic diagram illustrating an advance preparation process in a web search system.

FIG. 3 is a schematic diagram illustrating an advance preparation process in the web search system. In process 510, words or links included in each web page are investigated in advance. At this time, the crawling and the indexing are performed. If a search word is input in process 512, web pages including the search word are displayed in process 514. As described above, in the web search system, a data structure for easily giving a response to a search is prepared in advance.

[Differences Between Web Search System of Related Art and IoT Search System]

The differences between the web search system of the related art and the IoT search system are itemized.
  Since data of IoT is often just a bit string, the crawler may not be able to understand the meaning thereof.
  IoT data is likely to have no link to a page. It is difficult to detect whether or not there is an actual record of how often IoT data has been used.
  It is expected that there will be more requests to return data analysis results rather than search results of simply desiring seeing the information as the search word. Here, AI may be needed.
  A side searched by the web search system is basically in an activated state. On the other hand, a terminal on a sensor side searched by the IoT search system may not be in an activated state from a viewpoint of power consumption reduction or the like.

Figure 4:
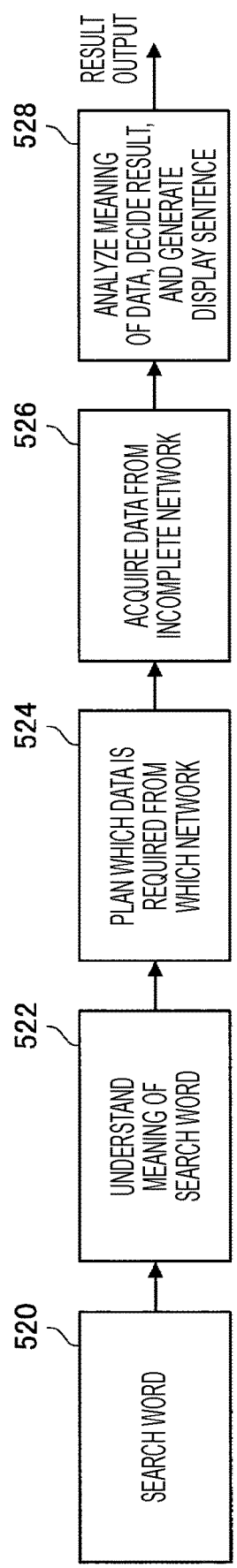
FIG. 4 is a schematic diagram illustrating a block diagram of an IoT search system.
Figure 5:
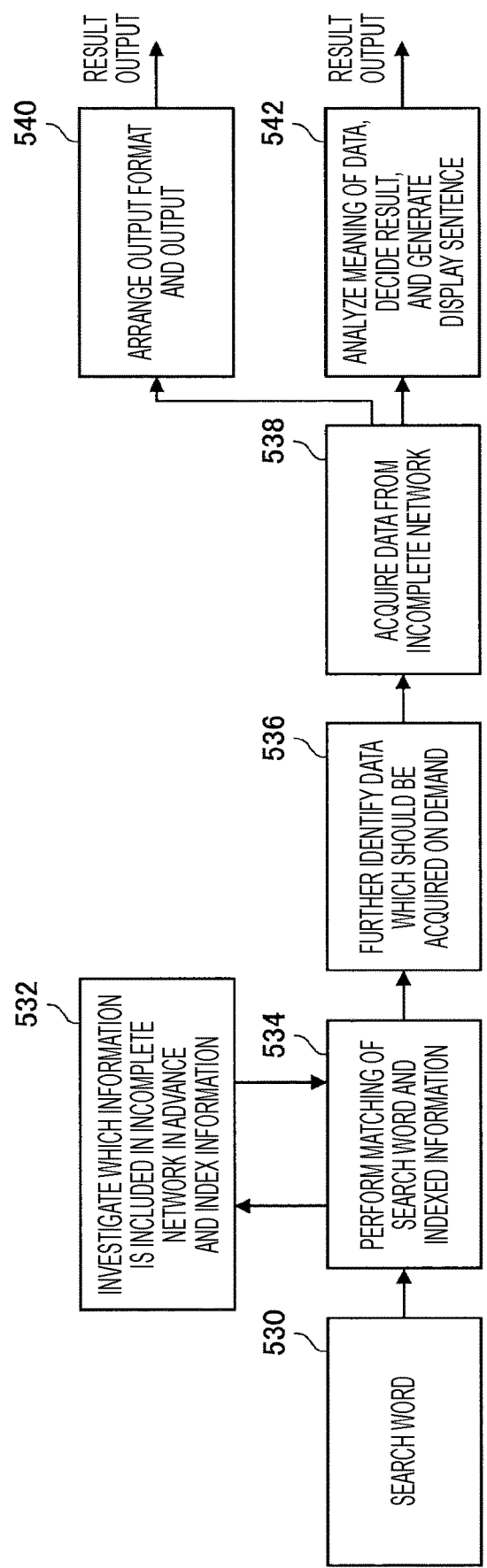
FIG. 5 is a schematic diagram illustrating a block diagram of an IoT search system.

FIGS. 4 and 5 are schematic diagrams illustrating block diagrams of the IoT search system. In process 520 of FIG. 4, a search word is input by the user. In process 522, a process of understanding the meaning of the search word is performed. Process 522 may be performed by a simple AI. In process 524, what type of data is required from which network is planned for the search word. In process 526, data is acquired from an incomplete network. In process 528, the meaning of the acquired data is analyzed, the search result is decided, and a sentence for displaying the search result is generated.

Further, in process 530 of FIG. 5, a search word is input. In process 532, information included in an incomplete network is investigated in advance and indexed. In process 534, matching the search word with the indexed information is performed. In process 536, content of data which should be acquired on demand is further specified. In process 538, data is acquired from the incomplete network. In process 540, an output format of the acquired data is arranged, and the result is output. Further, in process 542, the meaning of the acquired data is analyzed, the search result is decided, and a sentence for displaying the search result is generated.

[Tag of Data Necessary in IoT Search System]

Data giving the meaning of data with a simple text is referred to as metadata. The metadata is important in understanding the meaning of IoT data which is a simple bit string. In the present embodiment, how to assign the metadata will not be reviewed in detail. The metadata to data can be attached by a sensor, an application or the like. In the related art, the metadata attached by a person when a web is generated, whereas a case in which a local sensor attaches metadata is considered.

2. Overview of System According to the Present Disclosure

[Technical Area Focused on the Present Disclosure]

The present disclosure discloses the technology assuming a use case of an IoT search system for searching for information required by the user from an IoT device. Particularly, the present disclosure focuses on that the IoT search system recognizes that collecting data from a local storage at a local edge is an essential function, and collects data from the local storage. Therefore, not only an IoT search system but also the other general IoT systems are the subject and included within the scope of the present disclosure.

In the present disclosure, a point of understanding characters input to a search window by a person will not be focused on since the IoT search system may be executed by a machine as well as a person. Issues which arise further after a keyword to be searched is extracted will be focused. Further, it is also assumed that a tag is attached to IoT data. Particularly, in a case in which data and a tag in which content of the data is written are stored in an edge storage, pulling out the data and the tag from the network side thoughtlessly greatly affects power consumption of a sensor or the like at the edge. In the present disclosure, the problems including this point are expected to be solved.

[Devices Related to System of the Present Disclosure]

In a system of the present disclosure, in addition to a sensor that collects information and an IoT search system, a sensor management (a sensor management device) that manages the sensor is involved. The sensors that collect information is attached to all devices such as, for example, a household appliance (a home appliance), a mobile device such as a smartphone owned by a person, and an automobile. A storage that holds data detected by the sensor is installed along with the sensor. Further, a device in which the sensor is installed is a terminal (edge) device. Therefore, in this specification, the device (a terminal or a terminal device) in which the sensor is installed is also referred to as an "edge storage" or an "edge device."

Further, for convenience of description, the device (terminal device) in which the sensor is installed is also referred to simply as a sensor.

The edge storage, the sensor management, and the IoT search system are configured to be able to communicate with one another. For this reason, each of the edge storage, the sensor management, and the IoT search system has an information transmitting unit and an information receiving unit and can transmit information to other devices and acquire information from other devices. A communication scheme is not limited, but wired or wireless communication, particularly, wireless communication is assumed.

The sensor management is installed separately from the edge storage and configured as a device such as a server that manages the edge storage. In this specification, the sensor management is also referred to as a sensor management entity, an edge storage management entity, a sensor storage management entity, or the like. The sensor management has functions corresponding to the common service layer 16.

The IoT search system is a system that searches for data collected by the edge storage on the basis of the search word input by the user, and assumes a form in which the web search system in the current Internet is replaced with the IoT search system. A server having a search function corresponding to a device of the IoT search system device.

Figure 6:
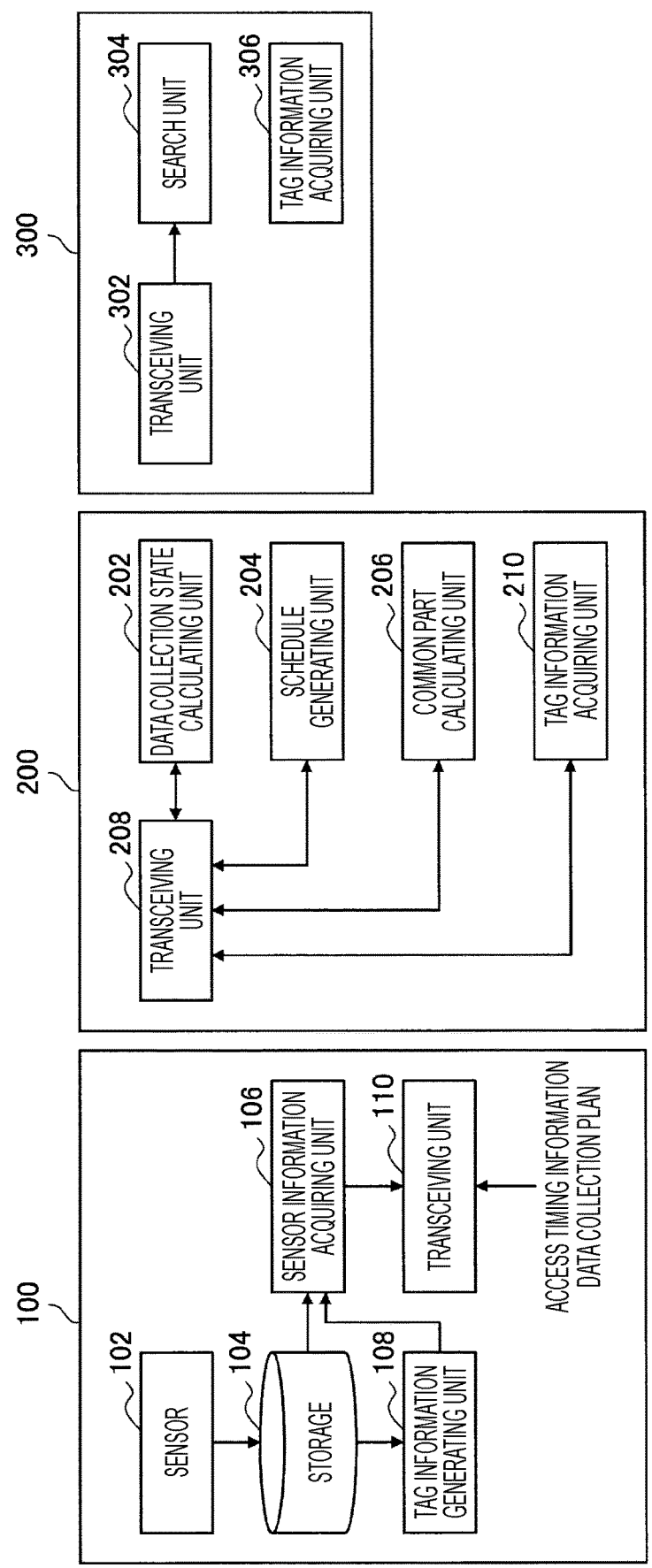
FIG. 6 is a schematic diagram illustrating configurations of a terminal device, a sensor management device, and a server of an IoT search system.

FIG. 6 is a schematic diagram illustrating configurations of a terminal device (edge storage) 100, a sensor management device (sensor management) 200, and a server 300 of an IoT search system. The terminal device 100 includes a sensor 102, a storage 104, a sensor information acquiring unit 106, a tag information generating unit 108, and a transceiving unit 110. The sensor management device 200 includes a data collection state calculating unit 202, a schedule generating unit 204, a common part calculating unit 206, a transceiving unit 208, and a tag information acquiring unit 210. The server 300 includes a transceiving unit 302, a search unit 304, and a tag information acquiring unit 306. Moreover, the components of the terminal device 100, the sensor management device 200, and the server 300 illustrated in FIG. 6 can be configured from hardware or a central processing device such as a CPU and software (program) causing them to function.

3. First Embodiment

A first embodiment relates to a method of acquiring data without imposing a burden on the edge sensor for the IoT search system. Specifically, the first embodiment relates to the following items

- A method of querying a time at which the IoT search system can access the edge storage in the sensor and/or a time at which access is not allowed or a period in which access is possible
- A method of setting a priority for each platform and changing an access permission time to the edge storage or the like for each priority
- A method in which the IoT sensor notifies the sensor management of the time at which a system of a third party can access
- An operation in which the IoT search system sucks data out of the sensor at an accessible time
- A method of preparing a plurality of settings of an accessible time for entities with different attributes In order to store the IoT data in the server side in advance, crawling is considered to be performed in order to acquire the tag information and the IoT data attached to the tag. Moreover, the crawling means going to get information of a specific sensor or server. At this time, many IoT devices have a limited activation time because of the demand for low power consumption. Therefore, there are cases in which the IoT device and the tag therein are unable to be accessed even though an attempt to get the tag information is made. Therefore, especially, for IoT devices, a problem in that crawling work efficiency becomes extremely low can be assumed.

In the first embodiment, a sensor such as each IoT device reports an accessible time (wake up time) to a constantly accessible server (sensor management) that knows information of that device. The IoT search system inquires the server in advance about which sensors can be accessed at which timing, and acquires information (access timing information) related to an accessible timing.

Figure 7:
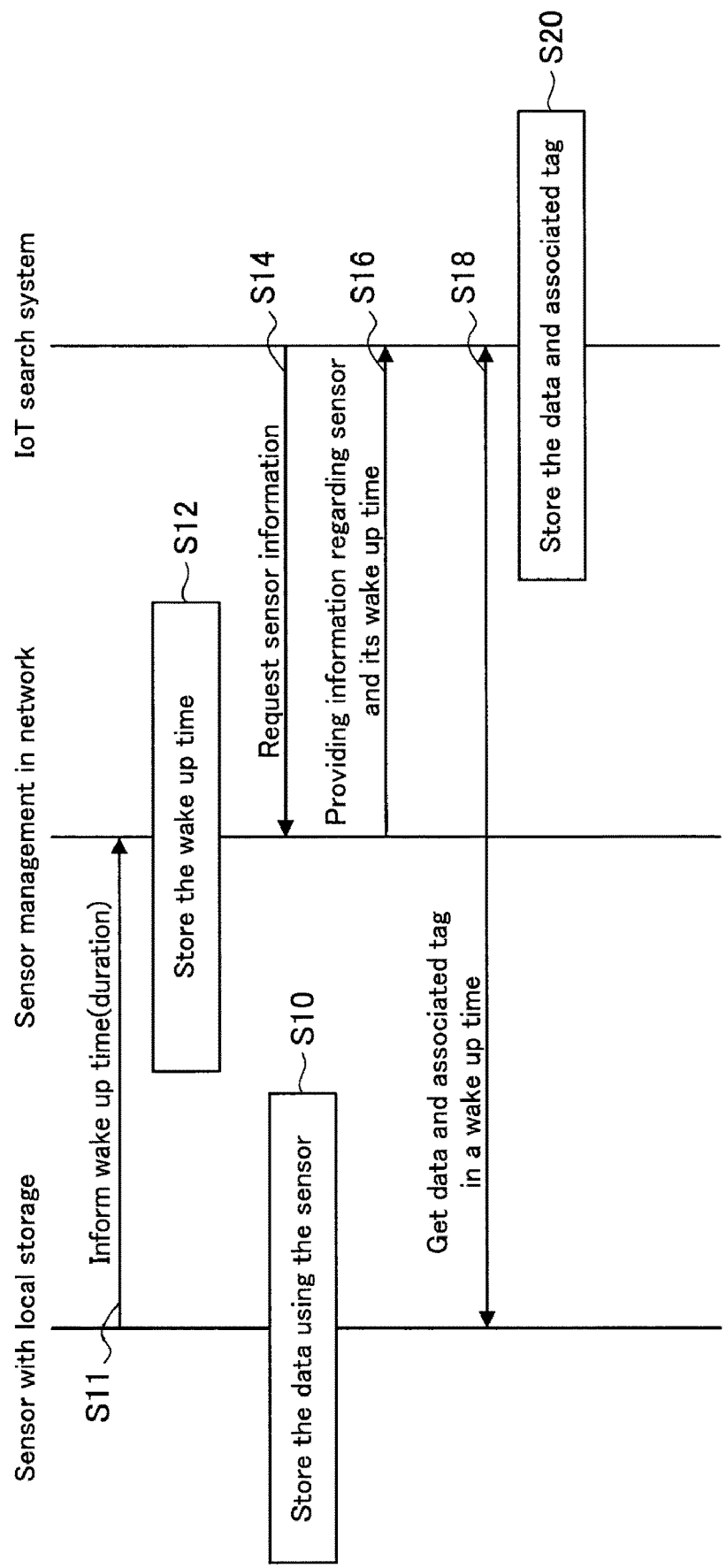
FIG. 7 is a sequence diagram illustrating a process according to a first embodiment.

FIG. 7 is a sequence diagram illustrating a process according to the first embodiment. FIG. 7 illustrates a process among the edge storage, the sensor management, and the IoT search system. In step S10, the edge storage continuously accumulates data acquired using the sensor. In step S11, the edge storage transmits a wake up time in which the edge storage is being activated to the sensor management. The wake up time corresponds to the access timing information described above. In step S12, the sensor management accumulates the wake up time. In step S14, the IoT search system transmits a sensor information request to the sensor management. In step S16, the sensor management transmits information related to the sensor and information related to the wake up time to the IoT search system. In step S18, the IoT search system acquires data and a tag from the edge storage within a period of time that the edge storage is being activated. In step S20, the IoT search system accumulates the data and the tags.

As described above, in the first embodiment, it accesses the sensor at the accessible time on the basis of the information related to the accessible timing to the sensor (the edge storage), and acquires the tag associated with the IoT data. Accordingly, the crawler (the IoT search system or the server thereof) can appropriately collect information. The reason why the IoT search system directly acquires the information from the sensor is that all data is not necessarily constantly collected on the network side, but rather, most of data is held locally, and there is a case in which it is sucked out to the network side when needed. Of course, old data is likely to be sucked out to the network side, but new data is often kept stored in the edge storage on the sensor side. In a case in which it is insufficient only with old data, it is necessary to obtain new data from the edge storage of the sensor, but in this case, it is possible to reduce battery consumption on the sensor side by accessing through the procedure illustrated in FIG. 7.

In step S11, the sensor notifies the sensor management of the accessible time to the sensor, but different values can be set in a plurality of systems as the accessible time as shown in Table 2.

TABLE 2 example of allowed access period

| Configuration | Target entity | Example value |
|---|---|---|
| 1 | Control entity within same platform | For every 10 seconds |
| 2 | entity with high priority outside platform | For every 1 hour |
| 3 | entity with low priority outside platform | For every 24 hours |

As shown in Table 2, the accessible time allowed for access from the inside of the same platform and the accessible time for access from the outside of the platform can be set to be different. It is possible to set a priority using this mechanism.

Tables 2, 3, and 4 show examples of formats used in signaling such as step S16 of FIG. 7 (Providing information regarding sensor and its wake up time). Further, Table 5 shows an example of a format used in signaling such as step S14 of FIG. 7 (Request sensor information).

TABLE 3 allowed accessible time

| Configuration | Target entity | Example value |
| --- | --- | --- |
| 1 | Control entity within same platform | Accessible at any time |
| 2 | entity with high priority outside platform | From 0 to 15 minutes every hour |
|   | entity with low priority outside platform | For 1 minute from 12:00 A.M. everyday |

TABLE 4 allowed accessible denial time

| Configuration | Target entity | Example value |
| --- | --- | --- |
| 1 | Control entity within same platform | None |
| 2 | entity with high priority outside platform | From 15 to 60 minutes every hour |
| 3 | entity with low priority outside platform | For time except 1 minute from 12:00 A.M. everyday |

TABLE 5 example of format of request

| Configuration | Target entity | Example value |
| --- | --- | --- |
| 1 | 1: Control entity within same platform | ID = 1 |
| 2 | 2: entity with high priority outside platform | ID = 2 |
| 3 | 3: entity with low priority outside platform | ID = 3 |

4. Second Embodiment

In a second embodiment, the sensor management which holds a data collection plan of the edge storage provides the information on the basis of a request from the IoT search system. The IoT search system determines whether or not it acquires data from the edge storage on the basis of the acquired information, and acquires the data.

The IoT device that pursues low power consumption or the sensor for IoT consume electric power if it is crawled, and information is obtained. For this reason, the accessible time to the edge storage is restricted as in the first embodiment. However, it is determined whether or not it is necessary to crawl up to data in the sensor in advance, and when it is not necessary to crawl the data in the sensor, it is important that an operation such as accessing is not performed on the sensor in order to collect data.

The sensor management holds the data collection plan (a schedule to collect data) held in the edge storage (the sensor), and holds information indicating how much data is stored in the sensor or the storage thereof after sucking the data out of the sensor last time. The IoT search system or other systems that require sensor data transmits an inquiry about a data acquisition state of the sensor or the edge storage which is difficult to access to the sensor management that manage the sensor or the edge storage before sucking out data of the sensor which is difficult to access (data accessibility) or data of the edge storage. Depending on the inquiry result, it is possible to reduce a burden on data transmission of the sensor or the like by accessing only when it is considered to be worthwhile to access the sensor or the like. Such an operation is not required in the crawler which is a robot for collecting data in the web of the related art and is an operation unique to the IoT search system.

Figure 8:
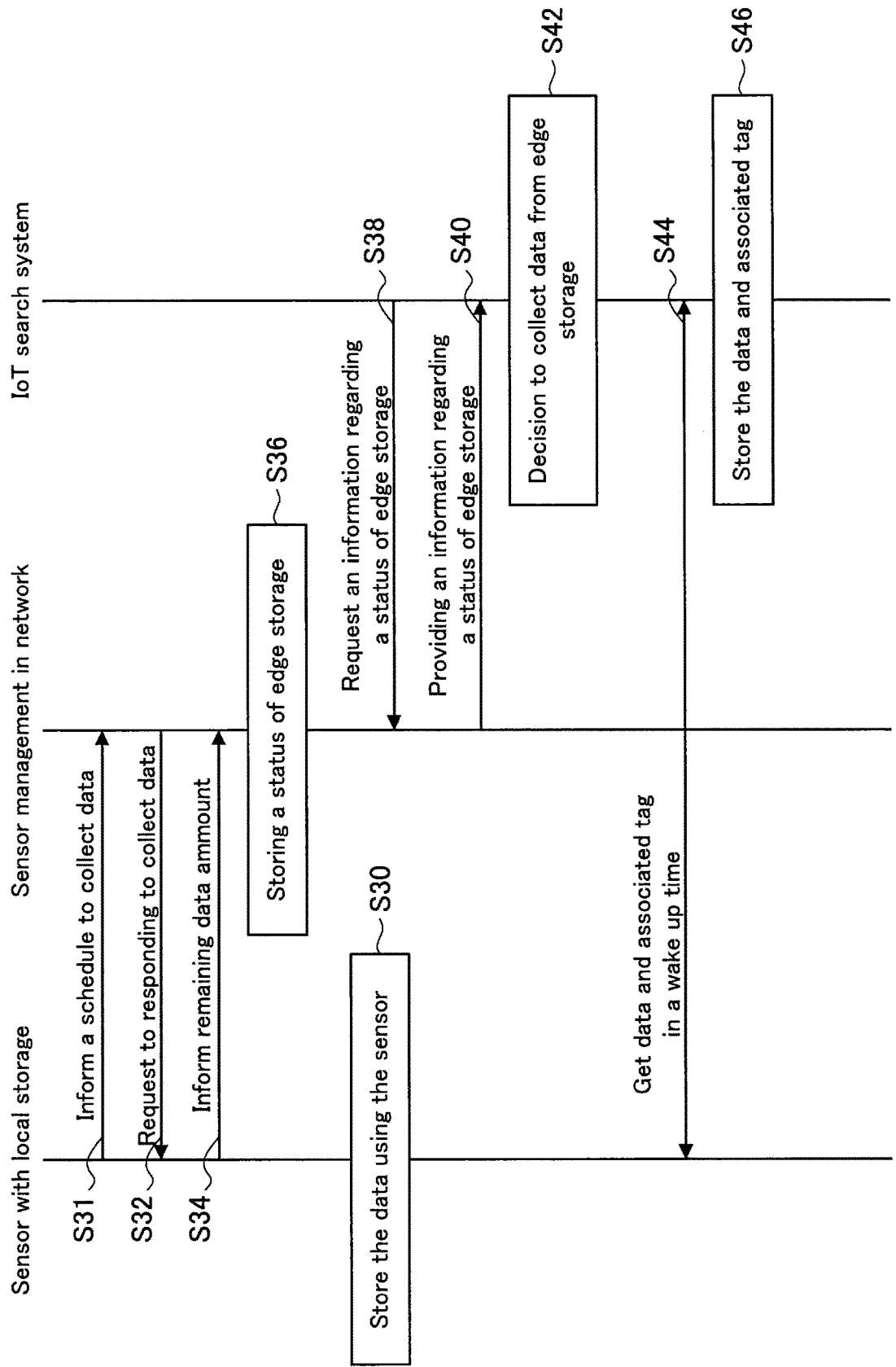
FIG. 8 is a sequence diagram illustrating a process according to a second embodiment.

FIG. 8 is a sequence diagram illustrating a process according to the second embodiment. FIG. 8 illustrates a process among the edge storage, the sensor management, and the IoT search system. In step S30, the edge storage continuously accumulates data acquired using the sensor. In step S31, the edge storage transmits the data collection plan (the schedule to collect data) to the sensor management. In step S32, the sensor management transmits a request to the edge storage to report data currently acquired by the edge storage. In step S34, the edge storage reports a remaining amount of data which is not acquired to the sensor management. In step S36, the sensor management accumulates the collection state of the data in the edge storage. In step S38, the IoT search system requests the sensor management to transmit the data collection state in the edge storage. In step S40, the sensor management transmits the data collection state in the edge storage to the IoT search system.

In step S42, the IoT search system decides to collect data from the edge storage on the basis of the data collection state in the edge storage. In step S44, the IoT search system acquires data and a tag from the edge storage within the period of time in which the edge storage is being activated. In step S46, the IoT search system accumulates the data and the tag.

Table 6 shows an example of the data collection plan of one sensor and a format representing a progress thereof. The sensor management holds information corresponding to Table 6 for each sensor.

TABLE 6 data collection plan and progress thereof

| Item | Content |
| --- | --- |
| Data collection plan | Temperature is collected for every 5 minutes and uploaded to Sensor management entity when collected for 3 days |
| Progress | Progress of 33% (that is, collected for 1 day) |

5. Third Embodiment

In a third embodiment, the sensor management performs scheduling on the basis of a priority of access to the edge storage required by a plurality of IoT systems. Specifically, the third embodiment relates to the following items.

The sensor management performs scheduling on the basis of the priority of access to the edge storage required by a plurality of IoT systems and transmits the schedule information to each IoT system.

The sensor management performs scheduling on the basis of the priority of access to the edge storage required by a plurality of IoT systems and acquires data instead of each IoT system.

Further, the sensor management identifies data of the greatest common divisor sub set of a data request to the edge storage required by a plurality of IoT systems and acquires the data as a representative.

The IoT search system comprehends a time that data can be acquired from the edge storage and presents the result to the end user. It presents how long it takes to get a search result.

In the first embodiment, the time at which the entity (device) such as the sensor with the edge storage can be accessed is restricted. However, if the crawler of the IoT search system comes to collect data at the restricted time with concentration, the entity such as the sensor is unable to cope with it.

In the third embodiment, an adjustment function of scheduling access for crawling (data collection) for each crawler (each IoT search system) is installed in the sensor management. This function is also referred to as a scheduler. The scheduler sucks data out of the sensor by substituting a request of each crawler. The sucked data is transmitted to the IoT search system which has made the request originally. A priority which scheduling is performed on the basis of depends on an implementation of the scheduler in the sensor management, but it may be requested together with a value corresponding to a priority of a QoS from each IoT search system in deciding a priority thereof.

Figure 9:
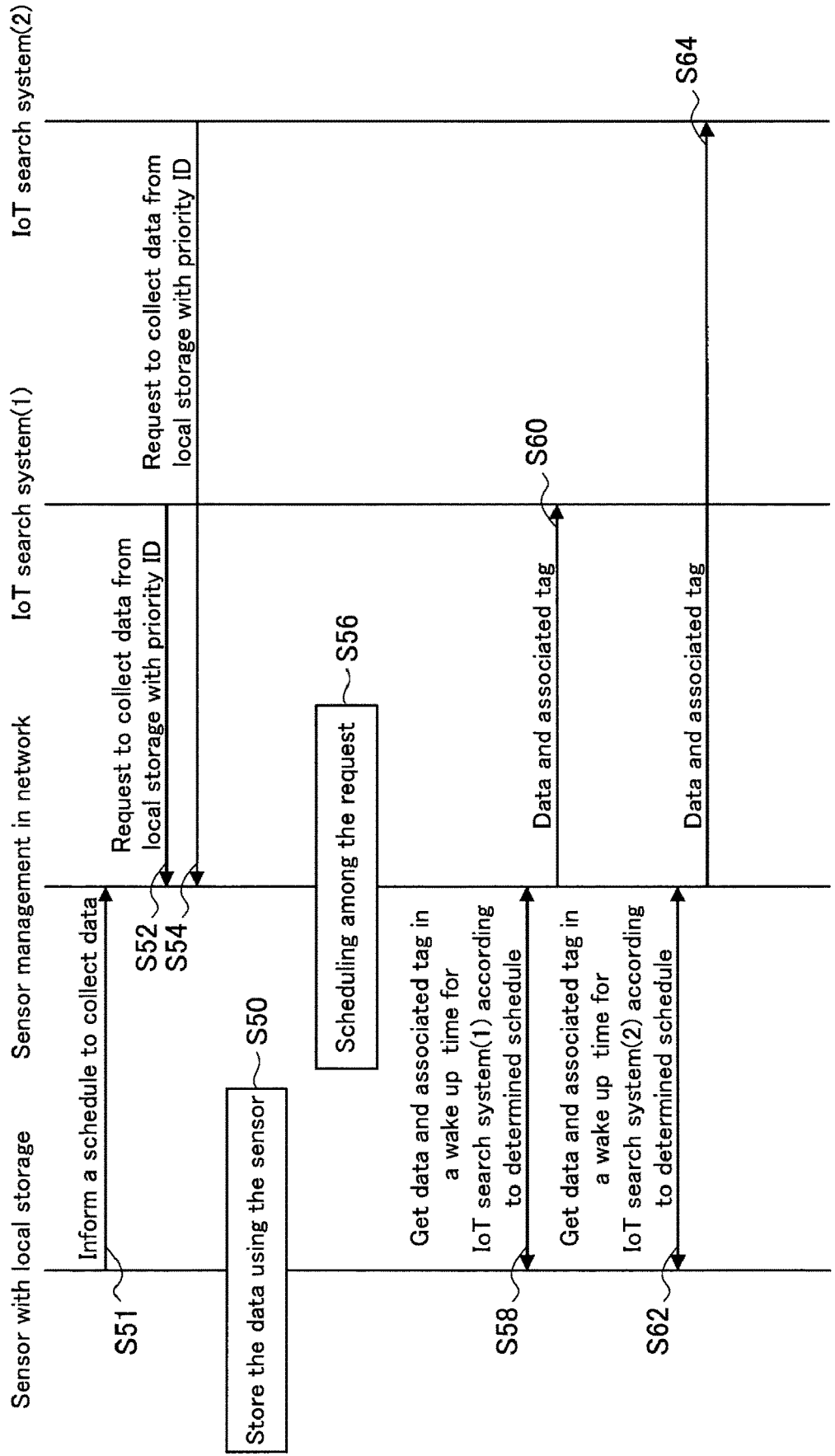
FIG. 9 is a sequence diagram illustrating a process according to a third embodiment.

FIG. 9 is a sequence diagram illustrating a process according to the third embodiment. FIG. 9 illustrates a process among the edge storage, the sensor management, and the IoT search system. In step S50, the edge storage continuously accumulates data acquired using the sensor. In step S51, the edge storage transmits the wake up time in which the edge storage is being activated to the sensor management. In step S52, the IoT search system (1) requests the sensor management to collect data from the edge storage by indicating a priority ID. In step S54, the IoT search system (2) requests the sensor management to collect data from the edge storage by indicating a priority ID.

In step S56, the sensor management schedules the requests from the IoT search system (1) and the IoT search system (2). In the scheduling, the priority ID is used.

In step S58, the sensor management acquires the data and the tag from the edge storage within a period of time in which the edge storage is being activated in accordance with the request of the IoT search system (1) on the basis of the schedule decided in step S56. In step S60, the sensor management transmits the data and the tag acquired in step S58 to the IoT search system (1).

In step S62, the sensor management acquires the data and the tag from the edge storage within a period of time in a case in which the edge storage is being activated in accordance with the request of the IoT search system (2) on the basis of the schedule decided in step S56. In step S64, the sensor management transmits the data and the tag acquired in step S62 to the IoT search system (2).

Figure 10:
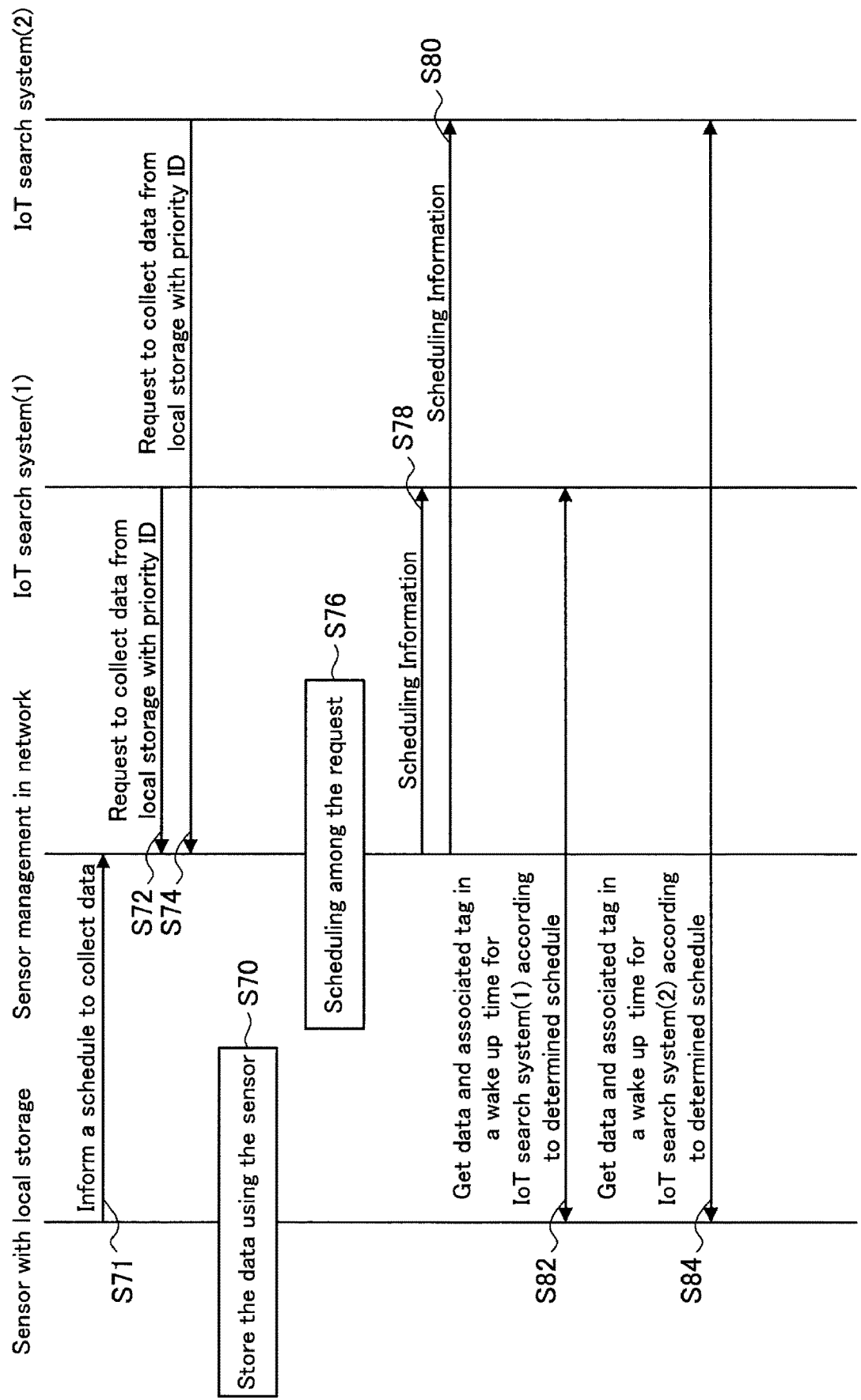
FIG. 10 is a sequence diagram illustrating a process according to another method of the third embodiment.

Further, in another method of the third embodiment, the scheduler (the sensor management) receives the request from each crawler (IoT search system) and notifies each crawler of the scheduling information decided by taking into account the priority of each crawler as the access time. FIG. 10 is a sequence diagram illustrating a process in this case. FIG. 10 illustrates the process among the edge storage, the sensor management, and the IoT search system. In step S70, the edge storage continuously accumulates data acquired using the sensor. In step S71, the edge storage transmits to the sensor management the wake up time in which the edge storage is being activated. In step S72, the IoT search system (1) requests the sensor management to collect the data from the edge storage by indicating the priority ID. In step S74, the IoT search system (2) requests the sensor management to collect data from the edge storage by indicating the priority ID.

In step S76, the sensor management schedules the requests from the IoT search system (1) and the IoT search system (2). In the scheduling, the priority ID is used. In step S78, the sensor management transmits the information of the schedule decided in step S76 to the IoT search system (1). In step S80, the sensor management transmits the information of the schedule decided in step S76 to the IoT search system (2).

In step S82, the IoT search system (1) acquires the data and the tag from the edge storage within a period of time in a case in which the edge storage is being activated on the basis of the schedule received in step S78.

In step S84, the IoT search system (2) acquires the data and the tag from the edge storage within the period of time in a case in which the edge storage is being activated on the basis of the schedule received in step S78.

Figure 11:
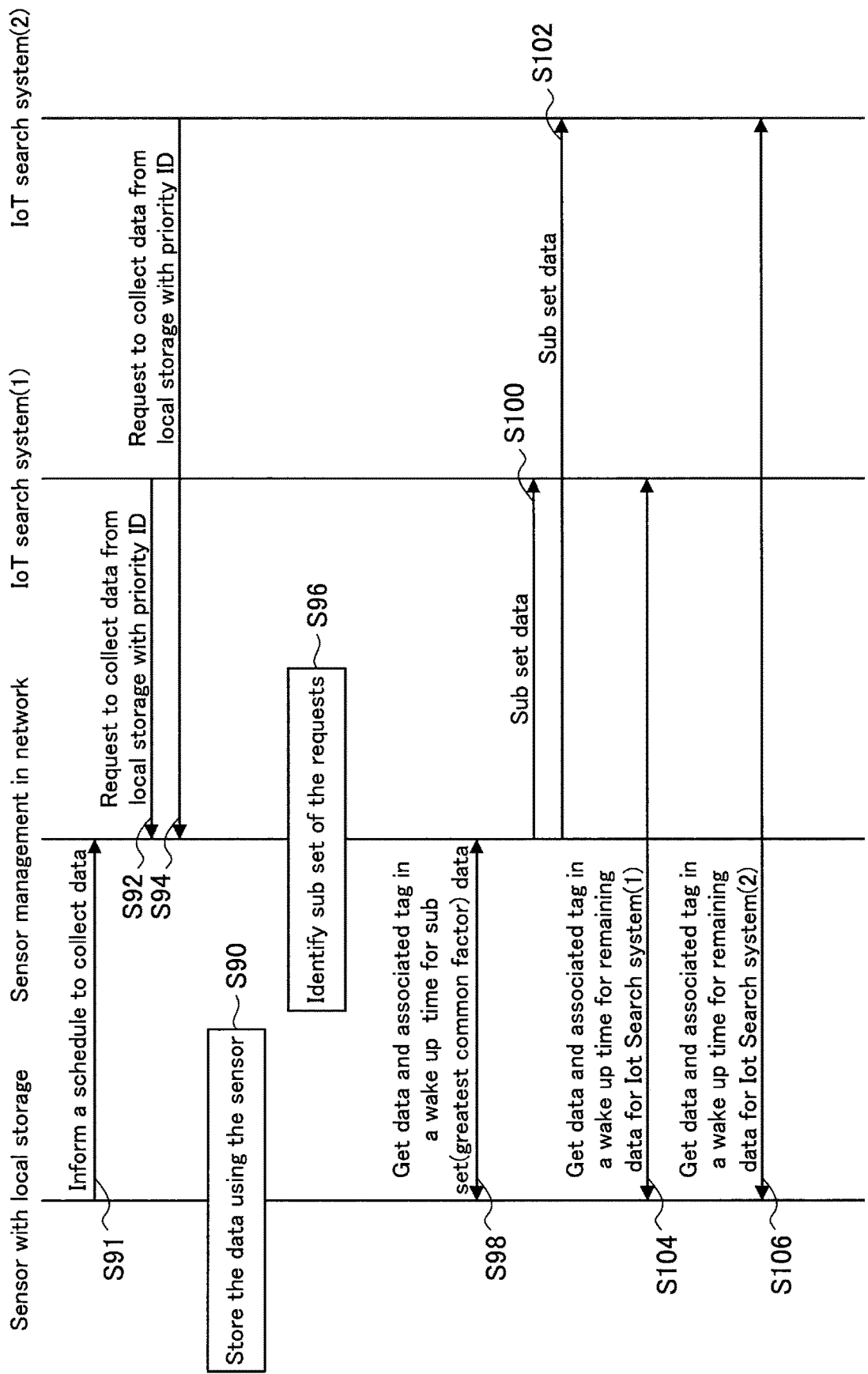
FIG. 11 is a sequence diagram illustrating a process according to still another method of the third embodiment.

Further, in still another method of the third embodiment, as information of the data desired to be collected in advance, information of a plurality of platforms or a plurality of IoT search systems is aggregated, and the greatest common divisor is identified for data to be collected. Then, the common information to be collected is obtained even without collecting data twice or more on the edge storage side. Then, the data is sucked out to the IoT search system side without imposing a burden on the sensor an appropriate timing. The sucked data is distributed in response to the search requests of a plurality of platforms or a plurality of IoT search systems which made reservation since they desire to have such data in advance. FIG. 11 is a sequence diagram illustrating a process in this case. FIG. 11 illustrates a process among the edge storage, the sensor management, and the IoT search system. In step S90, the edge storage continuously accumulates data acquired using the sensor. In step S91, the edge storage transmits the wake up time in which the edge storage is being activated to the sensor management. In step S92, the IoT search system (1) requests the sensor management to collect data from the edge storage by indicating a priority ID. In step S94, the IoT search system (2) requests the sensor management to collect data from the edge storage by indicating a priority ID.

In step S96, the sensor management identifies a sub set for the requests from the IoT search system (1) and the IoT search system (2). Here, the sub set corresponds to a collection request of common data among the requests from the IoT search system (1) and the IoT search system (2). In other words, the sub set indicates the greatest common divisor data of data desired to be collected by both systems about data desired to be collected by the IoT search system (1) and the IoT search system (2). In step S98, the sensor management acquires the data and the tag of the sub set from the edge storage within the period of time in which the edge storage is being activated.

In step S100, the sensor management transmits the data and the tag of the sub set to the IoT search system (1). At this time, the sensor management can also transmit information related to the remaining data not included in the data of the sub set for the data originally requested by the IoT search system (1) to the IoT search system (1).

In step S102, the sensor management transmits the data and the tag of the sub set to the IoT search system (2). At this time, the sensor management can also transmit information related to the remaining data not included in the data of the sub set for the data originally requested by the IoT search system (2) to the IoT search system (2).

In step S104, the IoT search system (1) acquires the remaining data and tag other than the sub set from the edge storage within the period of time in which the edge storage is being activated. In step S106, the IoT search system (2) acquires the remaining data and tag other than the sub set from the edge storage within the period of time in which the edge storage is being activated.

Further, in relation to the process illustrated in FIG. 9 to FIG. 11, the IoT search system can predict when it can receive the sensor result and thus can present the user with the time taken to transmit the search result.

6. Fourth Embodiment

In a fourth embodiment, the collection of the tag is directly performed on the sensor, and it relates to a method in which the data associated with the tag can be collected only through the sensor management that manages the sensor.

The crawler of the related art used in the web search or the like is able to simultaneously acquire a document or diagram of a web corresponding to IoT data and a tag simply indicating content of the document or the diagram of the web. However, in the IoT system, an amount of data is likely to be huge as compared with the tag. The operation of sucking out all pieces of data and processing them for indexing in the IoT search system becomes a big problem for the whole network. Moreover, the indexing is a process of organizing information in advance so that data is easily sucked out.

In the fourth embodiment, only the provision of the tag is allowed for the crawler (IoT search system), and actual data is collected only from the sensor management that manages the edge storage installed in the sensor or the like (an edge storage management entity/sensor storage management entity). In other words, it is a method in which the IoT search system is allowed to access to the edge storage (the edge device), but extractable content is limited to a certain area, and all pieces of data are acquirable from the sensor management that manages that the edge storage.

Figure 12:
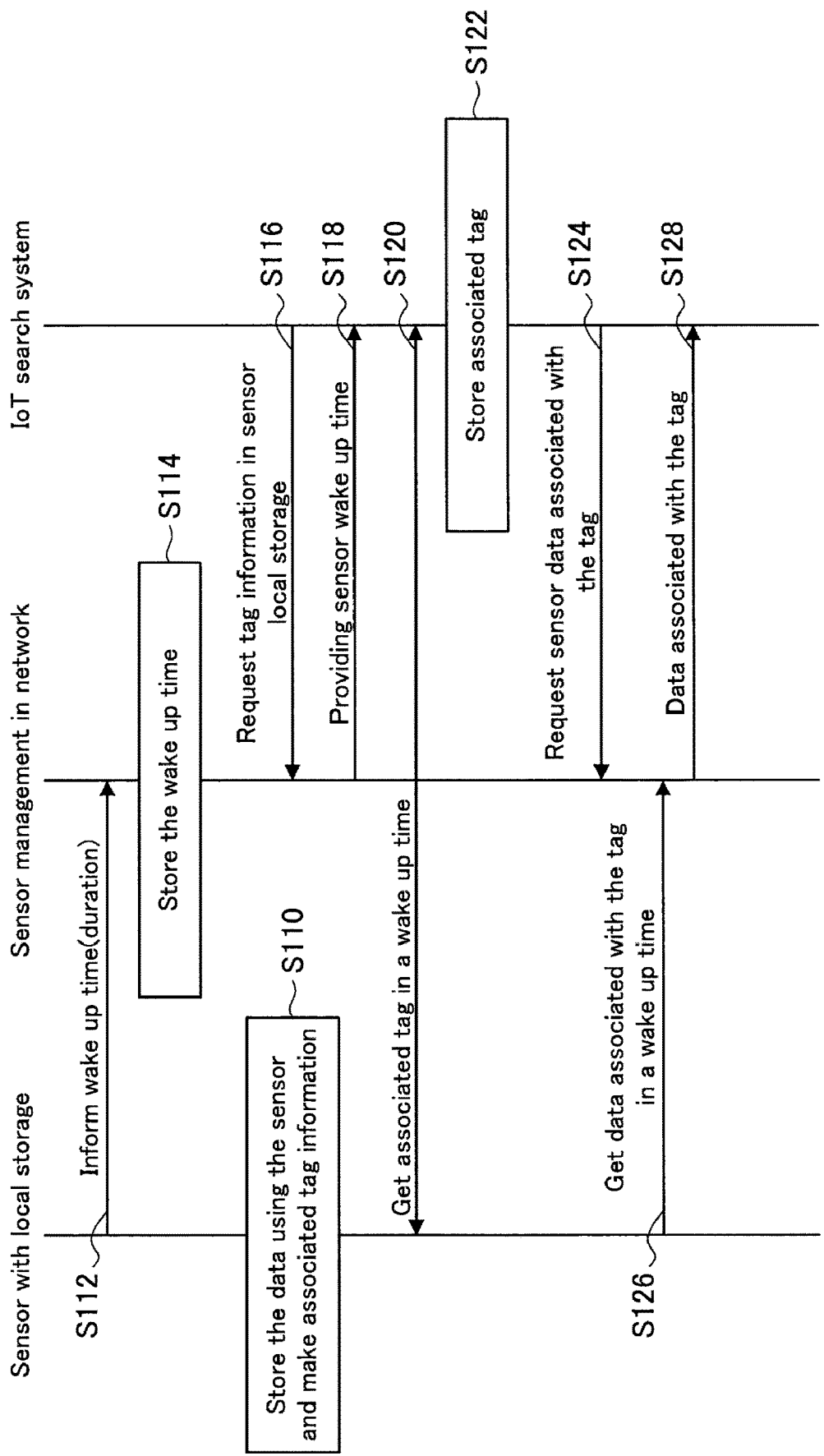
FIG. 12 is a sequence diagram illustrating a process according to a fourth embodiment.

FIG. 12 is a sequence diagram illustrating a process according to the fourth embodiment. FIG. 12 illustrates a process among the edge storage, the sensor management, and the IoT search system. In step S110, the edge storage continuously accumulates data acquired using the sensor and generates information of the tag. In step S112, the edge storage transmits the wake up time in which the edge storage is being activated to the sensor management. In step S114, the sensor management accumulates the wake up time.

In step S116, the IoT search system requests the sensor management to transmit the information of the tag of the edge storage. In step S118, the sensor management transmits information related to the wake up time in a case in which the edge storage is being activated to the IoT search system. In step S120, the IoT search system acquires the information of the tag within the wake up time from the edge storage.

In step S122, the IoT search system accumulates the information of the tag acquired from the edge storage. In step S124, the IoT search system requests the sensor management to transmit the data of the sensor associated with the tag. In step S126, the sensor management acquires the data of the sensor associated with the tag from the edge storage. In step S128, the sensor management transmits the data associated with the tag acquired in step S126 to the IoT search system.

In the IoT search system, it is necessary to organize in advance the server which is accessed for data collection on the basis of the tag collected in advance when an event desiring to collect data occurs. The tag data which is the information for that purpose needs to be constantly up-to-date, and thus it is necessary to access the sensor management directly and collect the data. The content of the tag is constantly updated in the latest state of the sensor. However, it is not necessary to collect up to the data indicated by the tag. It is because it is not known whether or not the data is necessary. In the IoT search system, it is enough even though what kind of data is stored where in advance is collected.

The tag can be collected directly from the sensor, but the data associated with the tag can be collected only through the sensor management. Accordingly, it is possible to reduce a burden on the sensor side associated with a response to unnecessary crawling. Further, as the IoT search system, since it is possible to acquire a new tag updated by the sensor by accessing the sensor directly, it is possible to keep a location of data necessary for the IoT search system in a form close to the latest form. Here, the meaning of accessing the sensor directly does not completely exclude acquiring through the sensor management and does not exclude that the IoT search system receives an IP address or a URL of the sensor from the sensor management.

7. Fifth Embodiment

In a fifth embodiment, a notification indicating a capability/device class of the sensor management (the sensor management entity) that manages the sensor is given to the IoT search system.

In the first to fourth embodiments, the sensor management that manages the sensor plays an important role. A sensor management having different capabilities may be arranged in the network. Even though the IoT search system accesses the sensor management without knowing the capabilities, it is unable to obtain useful information from the sensor management.

Table 7 shows an example of capabilities of the sensor management. Each IoT system transmits an information request for capabilities (a capability information request) to the sensor management in advance and obtains the information of Table 7. Instead of notifying of the capabilities, the sensor management may notify of a device class. For example, one in which all capability numbers 1 to 5 are valid is classified into a device class 1, and one in which four of the numbers 1 to 5 are valid is classified into a device class 2, and the other cases are classified into a device class 3.

TABLE 7 example of capability information

| Capability number | 1: Valid 0: Invalid | Content of Capability |
|---|---|---|
| 1 | 1/0 | Function of disclosing accessible time of Sensor |
| 2 | 1/0 | Function of notifying of accessible time for each priority |
| 3 | 1/0 | Function of disclosing data collection plan of Sensor |
| 4 | 1/0 | Function of disclosing progress of data collection of Sensor |
| 5 | 1/0 | Function of adjusting access to Sensor for each priority |

The preferred embodiments of the present disclosure have been described in detail with reference to the appended drawings, but the technical scope of the present disclosure is not limited to such examples. It is obvious to those skilled in the technical field of the present disclosure that various modifications or alterations can be made within the scope of the technical spirit set forth in claims, and they are understood to belong to the technical scope of the present disclosure.

Further, the effects described in this specification are merely explanatory or illustrative and not limiting. In other words, the technology according to the present disclosure can have other effects apparent to those skilled in the art from the description of this specification in addition to or instead of the effects described above.

Moreover, the following configurations also belong to the technical scope of the present disclosure.

(1) A terminal management device, including:
a receiving unit that receives, from a terminal that collects information from a sensor, access timing information related to an accessible timing to the terminal; and
a transmitting unit that transmits the access timing information to a server that searches for the information.

(2) The terminal management device according to (1), in which the access timing information differs in timing in accordance with a difference in a platform of the terminal.

(3) The terminal management device according to (2), in which the access timing information is defined by the following table so that a frequency of the accessible timing to the terminal differs in accordance with the platform and a priority of the terminal.

TABLE 10

| | Platform of terminal | Accessible timing |
|---|---|---|
| 1 | Terminal within same platform | For every 10 seconds |
| 2 | Terminal with high priority outside platform | For every 1 hour |
| 3 | Terminal with low priority outside platform | For every 24 hours |

(4) The terminal management device according to (2), in which the access timing information is defined by the following table so that a time of the accessible timing to the terminal differs in accordance with the platform and a priority of the terminal.

TABLE 11

| Configuration | Platform of terminal | Accessible time |
|---|---|---|
| 1 | Terminal within same platform | Accessible at any time |
| 2 | Terminal with high priority outside platform | From 0 to 15 minutes every hour |
| 3 | Terminal with low priority outside platform | For 1 minute from 12:00 A.M. everyday |

(5) The terminal management device according to (2), in which the access timing information includes information related to an access denial time at which the terminal denies access, and the access denial time is defined by the following table in accordance with the platform and a priority of the terminal.

TABLE 12

| | Platform of terminal | Access denial time |
|---|---|---|
| 1 | Terminal within same platform | None |
| 2 | Terminal with high priority outside platform | From 15 to 60 minutes every hour |
| 3 | Terminal with low priority outside platform | For time except 1 minute from 12:00 A.M. everyday |

(6) The terminal management device according to (1), in which an ID designating the terminal is received from the server, and the access timing information of the terminal corresponding to the ID is transmitted to the server in order for the server to access the terminal.

(7) A terminal device, including:
a sensor information acquiring unit that acquires information from a sensor; and
a transmitting unit that transmits access timing information related to an accessible timing of another device that desires to obtain the information to a terminal management device.

(8) The terminal device according to (7), in which the access timing information differs in timing in accordance with a difference in a platform.

(9) The terminal device according to (8), in which the access timing information is defined by the following table so that a frequency of the accessible timing differs in accordance with a platform and a priority.

TABLE 13

| | Platform of terminal device | Accessible timing |
|---|---|---|
| 1 | Terminal device within same platform | For every 10 seconds |
| 2 | Terminal device with high priority outside platform | For every 1 hour |
| 3 | Terminal device with low priority outside platform | For every 24 hours |

(10) The terminal device in accordance with (8), in which the access timing information is defined by the following table so that a time of the accessible timing in accordance with a platform and a priority.

TABLE 14

| | Platform of terminal device | Accessible time |
|---|---|---|
| 1 | Terminal device within same platform | Accessible at any time |
| 2 | Terminal device with high priority outside platform | From 0 to 15 minutes every hour |
| 3 | Terminal device with low priority outside platform | For 1 minute from 12:00 A.M. everyday |

(11) The terminal device according to (8,) in which the access timing information includes information related to an access denial time at which access by another device is denied, and the access denial time is defined by the following table in accordance with the platform and a priority of the terminal.

TABLE 15

| | Platform of terminal device | Access denial time |
|---|---|---|
| 1 | Terminal device within same platform | None |
| 2 | Terminal device with high priority outside platform | From 15 to 60 minutes every hour |

TABLE 15-continued

| | Platform of terminal device | Access denial time | |
|---|---|---|---|
| 3 | Terminal device with low priority outside platform | For time except 1 minute from 12:00 A.M. everyday | 5 |

(12) A server, including:
a receiving unit that receives access timing information related to an accessible timing to a terminal that collects information from a sensor,
in which the information of the terminal is searched for on the basis of the access timing information.

(13) A terminal device, including:
a sensor information acquiring unit that acquires information from a sensor;
a transmitting unit that transmits plan information related to a plan for collecting data from the sensor to a terminal management device,

(14) The terminal device according to (13), in which the plan information is defined by the following table in accordance with a frequency of collecting the information and a timing at which a progress of the collection of the information is uploaded to the terminal management device.

TABLE 16

| Item | Content |
|---|---|
| Data collection plan | Information is collected for every x minutes and uploaded when collected for y days (here, x and y are arbitrary values) |

(15) A terminal management device, including:
a receiving unit that receives, from a terminal that collects information from a sensor, plan information related to a plan for collecting the information from the sensor;
a data collection state calculating unit that calculates a data collection state in the terminal on a basis of the plan information and a progress of the collection of the information in the terminal; and
a transmitting unit that transmits the data collection state to a server that searches for the information.

(16) The terminal management device according to claim 15, in which the plan information is defined by the following table in accordance with a frequency of collecting the information and a timing at which a progress of the collection of the information is uploaded.

TABLE 17

| Item | Content |
|---|---|
| Data collection plan | Information is collected for every x minutes and uploaded when collected for y days (here, x and y are arbitrary values) |

(17) A terminal device, including:
a sensor information acquiring unit that acquires information from a sensor; and
a transmitting unit that transmits the information to a terminal management device in accordance with a schedule generated by the terminal management device on a basis of priorities included in information collection requests obtained from a plurality of servers that search for the information.

(18) A terminal management device, including:
a receiving unit that receives information collection requests from a plurality of servers having a search function;
a schedule generating unit that generates a schedule for providing information to the plurality of servers on a basis of priorities included in the information collection requests; and
a transmitting unit that acquires the information from a terminal that collects the information from the sensor on a basis of the schedule and transmits the information to each of the plurality of servers.

(19) A terminal device, including:
a sensor information acquiring unit that acquires information from a sensor; and
a transmitting unit that transmits the information to a plurality of servers in accordance with a schedule generated by the terminal management device on a basis of priorities included in information collection requests obtained from a plurality of servers that search for the information.

(20) A terminal management device, including:
a receiving unit that receives information collection requests from a plurality of servers having a search function;
a schedule generating unit that generates a schedule for the plurality of servers to acquire the information from a terminal that collects information from a sensor on a basis of priorities included in the information collection requests; and
a transmitting unit that transmits the schedule to the plurality of servers.

(21) A terminal device, including:
a sensor information acquiring unit that acquires information from a sensor; and
a transmitting unit that transmits information commonly included in information collection requests calculated by a terminal management device that receives the information collection requests acquired from a plurality of servers that search for the information to the terminal management device.

(22) A terminal management device, including:
a receiving unit that receives information collection requests from a plurality of servers having a search function;
a common part calculating unit that calculates a common part of the information collection requests received from the plurality of servers; and
a transmitting unit that acquires data related to the common part from a terminal that collects information from a sensor and transmits the data to each of the plurality of servers.

(23) A terminal device, including:
a sensor information acquiring unit that acquires information from a sensor;
a tag information generating unit that generates tag information identifying the information; and a transmitting unit that transmits the tag information to a terminal management device.

(24) A terminal management device, including:
a tag information acquiring unit that acquires tag information identifying information from a terminal that acquires the information from a sensor; and
a transmitting unit that transmits the tag information to a server that searches for the information.

(25) A server, including:
a tag information acquiring unit that acquires tag information identifying in a terminal that acquires the information from a sensor; and
a search unit that searches for the information of the terminal on the basis of the tag information.
(26) A terminal management device, including:
a receiving unit that receives an information request for capabilities of the terminal management device related to a terminal that collects information from a sensor from a server having a search function; and
a transmitting unit that transmits the capabilities related to the terminal defined by the following table to the server in response to the information request.

TABLE 18

| Capability number | 1: Valid 2: Invalid | Content of capability |
|---|---|---|
| 1 | 1/0 | Function of disclosing accessible time of terminal |
| 2 | 1/0 | Function of notifying of accessible time for each priority of terminal |
| 3 | 1/0 | Function of disclosing data collection plan information of terminal |
| 4 | 1/0 | Function of disclosing progress of data collection of terminal |
| 5 | 1/0 | Function of adjusting access to terminal for each priority |

(27) A server, including:
a receiving unit that receives, from a terminal management device that manages a terminal that collects information from a sensor, capabilities of the terminal management device related to the terminal defined by the following table; and
a search unit that searches for the information in accordance with the capabilities.

TABLE 19

| Capability number | 1: Valid 2: Invalid | Content of capability |
|---|---|---|
| 1 | 1/0 | Function of disclosing accessible time of terminal |
| 2 | 1/0 | Function of notifying of accessible time for each priority of terminal |
| 3 | 1/0 | Function of disclosing data collection plan information of terminal |
| 4 | 1/0 | Function of disclosing progress of data collection of terminal |
| 5 | 1/0 | Function of adjusting access to terminal for each priority |

(28) A method in a terminal management device, including:
receiving, from a terminal that collects information from a sensor, access timing information related to an accessible timing to the terminal; and
transmitting the access timing information to a server that searches for the information.
(29) The method in the terminal management device according to (28), in which the access timing information differs in timing in accordance with a difference in a platform of the terminal.
(30) The method in the terminal management device according to (29), in which the access timing information is defined by the following table so that a frequency of the accessible timing to the terminal differs in accordance with the platform and a priority of the terminal.

TABLE 20

| | Platform of terminal | Accessible timing |
|---|---|---|
| 1 | Terminal within same platform | For every 10 seconds |
| 2 | Terminal with high priority outside platform | For every 1 hour |
| 3 | Terminal with low priority outside platform | For every 24 hours |

(31) The method in the terminal management device according to (29), in which the access timing information is defined by the following table so that a time of the accessible timing to the terminal differs in accordance with the platform and a priority of the terminal.

TABLE 21

| | Platform of terminal | Accessible timing |
|---|---|---|
| 1 | Terminal within same platform | Accessible at any time |
| 2 | Terminal with high priority outside platform | From 0 to 15 minutes every hour |
| 3 | Terminal with low priority outside platform | For 1 minute from 12:00 A.M. everyday |

(32) The method in the terminal management device according to (29), in which the access timing information includes information related to an access denial time at which the terminal denies access, and the access denial time is defined by the following table in accordance with the platform and a priority of the terminal.

| | Platform of terminal | Access denial time |
|---|---|---|
| 1 | Terminal within same platform | None |
| 2 | Terminal with high priority outside platform | From 15 to 60 minutes every hour |
| 3 | Terminal with low priority outside platform | For time except 1 minute from 12:00 A.M. everyday |

(33) The method in the terminal management device according to (28), in which an ID designating the terminal is received from the server, and the access timing information of the terminal corresponding to the ID is transmitted to the server in order for the server to access the terminal.
(34) A method in a terminal device, including:
acquiring information from a sensor; and
transmitting access timing information related to an accessible timing of another device that desires to obtain the information to a terminal management device.
(35) The method in the terminal device according to (34), in which the access timing information differs in timing in accordance with a difference in a platform.
(36) The method in the terminal device according to (35), in which the access timing information is defined by the following table so that a frequency of the accessible timing differs in accordance with a platform and a priority.

TABLE 23

| | Platform of terminal device | Accessible timing |
|---|---|---|
| 1 | Terminal device within same platform | For every 10 seconds |
| 2 | Terminal device with high priority outside platform | For every 1 hour |
| 3 | Terminal device with low priority outside platform | For every 24 hours |

(37) The method in the terminal device in accordance with (35), in which the access timing information is defined by the following table so that a time of the accessible timing in accordance with a platform and a priority.

TABLE 24

| | Platform of terminal device | Accessible time |
|---|---|---|
| 1 | Terminal device within same platform | Accessible at any time |
| 2 | Terminal device with high priority outside platform | From 0 to 15 minutes every hour |
| 3 | Terminal device with low priority outside platform | For 1 minute from 12:00 A.M. everyday |

(38) The method in the terminal device according to (35,) in which the access timing information includes information related to an access denial time at which access by another device is denied, and the access denial time is defined by the following table in accordance with the platform and a priority of the terminal.

TABLE 25

| | Platform of terminal device | Access denial time |
|---|---|---|
| 1 | Terminal device within same platform | None |
| 2 | Terminal device with high priority outside platform | From 15 to 60 minutes every hour |
| 3 | Terminal device with low priority outside platform | For time except 1 minute from 12:00 A.M. everyday |

(39) A method in a server, including:
receiving access timing information related to an accessible timing to a terminal that collects information from a sensor,
in which the information of the terminal is searched for on the basis of the access timing information.
(40) A method in a terminal device, including:
acquiring information from a sensor;
transmitting plan information related to a plan for collecting data from the sensor to a terminal management device,
(41) The method in the terminal device according to (40), in which the plan information is defined by the following table in accordance with a frequency of collecting the information and a timing at which a progress of the collection of the information is uploaded to the terminal management device.

TABLE 26

| Item | Content |
|---|---|
| Data collection plan | Information is collected for every x minutes and uploaded when collected for y days (here, x and y are arbitrary values) |

(42) A method in a terminal management device, including:
receiving, from a terminal that collects information from a sensor, plan information related to a plan for collecting the information from the sensor;
calculating a data collection state in the terminal on a basis of the plan information and a progress of the collection of the information in the terminal; and
transmitting the data collection state to a server that searches for the information.
(43) The method in the terminal management device according to claim 15, in which the plan information is defined by the following table in accordance with a frequency of collecting the information and a timing at which a progress of the collection of the information is uploaded.

TABLE 27

| Item | Content |
|---|---|
| Data collection plan | information is collected for every x minutes and uploaded when collected for y days (here, x and y are arbitrary values) |

(44) A method in a terminal device, including:
acquiring information from a sensor; and
transmitting the information to a terminal management device in accordance with a schedule generated by the terminal management device on a basis of priorities included in information collection requests obtained from a plurality of servers that search for the information.
(45) A method in a terminal management device, including:
receiving information collection requests from a plurality of servers having a search function;
generating a schedule for providing information to the plurality of servers on a basis of priorities included in the information collection requests; and
acquiring the information from a terminal that collects the information from the sensor on a basis of the schedule and transmitting the information to each of the plurality of servers.
(46) A method in a terminal device, including:
acquiring information from a sensor; and
transmitting the information to a plurality of servers in accordance with a schedule generated by the terminal management device on a basis of priorities included in information collection requests obtained from a plurality of servers that search for the information.
(47) A method in a terminal management device, including:
receiving information collection requests from a plurality of servers having a search function;
generating a schedule for the plurality of servers to acquire the information from a terminal that collects information from a sensor on a basis of priorities included in the information collection requests; and
transmitting the schedule to the plurality of servers.
(48) A method in a terminal device, including:
acquiring information from a sensor; and
transmitting information commonly included in information collection requests calculated by a terminal management device that receives the information collection requests acquired from a plurality of servers that search for the information to the terminal management device.

(49) A method in a terminal management device, including:
receiving information collection requests from a plurality of servers having a search function;
calculating a common part of the information collection requests received from the plurality of servers; and
acquiring data related to the common part from a terminal that collects information from a sensor and transmits the data to each of the plurality of servers.

(50) A method in a terminal device, including:
acquiring unit information from a sensor;
generating tag information identifying the information; and
transmitting the tag information to a terminal management device.

(51) A method in a terminal management device, including:
acquiring tag information identifying information from a terminal that acquires the information from a sensor; and
transmitting the tag information to a server that searches for the information.

(52) A method in a server, including:
acquiring tag information identifying in a terminal that acquires the information from a sensor; and
searching for the information of the terminal on the basis of the tag information.

(53) A method in a terminal management device, including:
receiving an information request for capabilities of the terminal management device related to a terminal that collects information from a sensor from a server having a search function; and
transmitting the capabilities related to the terminal defined by the following table to the server in response to the information request.

TABLE 28

| Capability number | 1: Valid 2: Invalid | Content of capability |
|---|---|---|
| 1 | 1/0 | Function of disclosing accessible time of terminal |
| 2 | 1/0 | Function of notifying of accessible time for each priority of. terminal |
| 3 | 1/0 | Function of disclosing data collection plan information of terminal |
| 4 | 1/0 | Function of disclosing progress of data collection of terminal |
| 5 | 1/0 | Function of adjusting access to terminal for each priority |

(54) A method in a server, including:
receiving, from a terminal management device that manages a terminal that collects information from a sensor, capabilities of the terminal management device related to the terminal defined by the following table; and
searching for the information in accordance with the capabilities.

TABLE 29

| Capability number | 1: Valid 2: Invalid | Content of capability |
|---|---|---|
| 1 | 1/0 | Function of disclosing accessible time of terminal |
| 2 | 1/0 | Function of notifying of accessible time for each priority of terminal |
| 3 | 1/0 | Function of disclosing data collection plan information of terminal |
| 4 | 1/0 | Function of disclosing progress of data collection of terminal |
| 5 | 1/0 | Function of adjusting access to terminal for each priority |

REFERENCE SIGNS LIST

100 Terminal device
102 Sensor
104 Storage
106 Sensor information acquiring unit
108 Tag information generating unit
110 Transmitting unit
200 Sensor management device
202 Data collection state calculating unit
204 Schedule generating unit
206 Common part calculating unit
208 Transceiving unit
210 Tag information acquiring unit
300 Server
302 Transceiving unit
304 Search unit
306 Tag information acquiring unit

The invention claimed is:
1. A terminal management device, comprising:
a receiving unit configured to receive, from a terminal that collects information from a sensor, access timing information related to an accessible timing to the terminal; and
a transmitting unit configured to transmit the access timing information to a server that searches for the information,
wherein the access timing information differs in frequency and time of the accessible timing to the terminal in accordance with a difference in a platform and a priority of the terminal,
wherein the access timing information is defined so that a frequency of the accessible timing to the terminal is a first frequency based on the priority of the terminal being a first priority and the frequency of the accessible timing to the terminal is a second frequency higher than the first frequency based on the priority of the terminal being a second priority higher than the first priority,
wherein the accessible timing to the terminal occurs a first number of times within a period of time in the first frequency and the accessible timing to the terminal occurs a second number of times within the period of time in the second frequency, the second number of times being higher than the first number of times, and
wherein the receiving unit and the transmitting unit are each implemented via at least one processor.

2. The terminal management device according to claim 1, wherein the access timing information is defined so that the frequency of the accessible timing to the terminal differs in accordance with the platform and the priority of the terminal such that the accessible timing allowed for access from inside of the same platform is for every 10 seconds, the accessible timing allowed for access with high priority outside the platform is for every 1 hour, and the accessible timing allowed for access with low priority outside the platform is for every 24 hours.

3. The terminal management device according to claim 1, wherein the access timing information is defined so that a time of the accessible timing to the terminal differs in accordance with the platform and the priority of the terminal such that the accessible timing allowed for access from inside of the same platform is at any time, the accessible timing allowed for access with high priority outside the platform is from 0 to 15 minutes every hour, and the accessible timing allowed for access with low priority outside the platform is for 1 minute from 12:00 A.M. every day.

4. The terminal management device according to claim 1, wherein the access timing information includes information related to an access denial time at which the terminal denies access, and the access denial time is in accordance with the platform and the priority of the terminal such that the access denial time for access from inside of the same platform is at no time, the access denial time denied for access with high priority outside the platform is from 15 to 60 minutes every hour, and the access denial time for access with low priority outside the platform is for 1 minute from 12:00 A.M. everyday.

5. The terminal management device according to claim 1, wherein an ID designating the terminal is received from the server, and the access timing information of the terminal corresponding to the ID is transmitted to the server in order for the server to access the terminal.

6. A terminal device, comprising:
a sensor information acquiring unit configured to acquire information from a sensor; and
a transmitting unit configured to transmit access timing information related to an accessible timing of another device that desires to obtain the information to a terminal management device,
wherein the access timing information differs in frequency and time of the accessible timing to the terminal device in accordance with a difference in a platform and a priority of the terminal device,
wherein the access timing information is defined so that a frequency of the accessible timing to the terminal device is a first frequency based on the priority of the terminal device being a first priority and the frequency of the accessible timing to the terminal device is a second frequency higher than the first frequency based on the priority of the terminal device being a second priority higher than the first priority,
wherein the accessible timing to the terminal device occurs a first number of times within a period of time in the first frequency and the accessible timing to the terminal device occurs a second number of times within the period of time in the second frequency, the second number of times being higher than the first number of times, and
wherein the sensor information acquiring unit and the transmitting unit are each implemented via at least one processor.

7. The terminal device according to claim 6, wherein the access timing information is defined so that the frequency of the accessible timing differs in accordance with the platform and the priority of the terminal device such that the accessible timing allowed for access from inside of the same platform is for every 10 seconds, the accessible timing allowed for access with high priority outside the platform is for every 1 hour, and the accessible timing allowed for access with low priority outside the platform is for every 24 hours.

8. A terminal device, comprising:
a sensor information acquiring unit configured to acquire information from a sensor; and
a transmitting unit configured to transmit, to a terminal management device, plan information related to a plan for collecting data from the sensor,
wherein the plan information is in accordance with a frequency and duration of time of collecting and storing the information and a timing at which a progress of an amount of time of the duration of time of the collection of the information is transmitted to the terminal management device such that information is collected for every x minutes and uploaded when collected for y days, where x and y are arbitrary values greater than or equal to 1, and wherein the sensor information acquiring unit and the transmitting unit are each implemented via at least one processor.

9. A terminal management device, comprising:
a receiving unit configured to receive, from a terminal that collects information from a sensor, plan information related to a plan for collecting the information from the sensor;
a data collection state calculating unit configured to calculate a data collection state in the terminal on a basis of the plan information and a progress of the collection of the information in the terminal; and
a transmitting unit configured to transmit the data collection state to a server that searches for the information,
wherein the plan information is defined in accordance with a frequency and duration of time of collecting and storing the information and a timing at which a progress of an amount of time of the duration of time of the collection of the information is transmitted to the terminal management device, such that information is collected for every x minutes and uploaded when collected for y days, wherein x and y are arbitrary values greater than or equal to 1, and
wherein the receiving unit, the data collection state calculating unit, and the transmitting unit are each implemented via at least one processor.

10. A terminal device, comprising:
a sensor information acquiring unit configured to acquire information from a sensor of a plurality of sensors; and
a transmitting unit configured to
transmit the information to a terminal management device in accordance with a schedule generated by the terminal management device, and
transmit access timing information related to an accessible timing of another device that desires to obtain the information to the terminal management device,
wherein the schedule is generated on a basis of priorities of access to the terminal device required to collect the information from the plurality of sensors and included in information collection requests obtained from a plurality of servers that search for the information, wherein the access timing information differs in frequency and time of the accessible timing to the terminal device in accordance with a difference in a platform and a priority of the terminal device, and wherein the sensor information acquiring unit and the transmitting unit are each implemented via at least one processor.

11. A terminal management device, comprising:

a receiving unit configured to
receive information collection requests from a plurality of servers, each server having a search function, for a terminal to acquire information from a sensor of a plurality of sensors, and
receive, from the terminal, access timing information related to an accessible timing to the terminal;

a schedule generating unit configured to generate a schedule for providing information to the plurality of servers on a basis of priorities of access to the terminal required to collect information from the plurality of sensors and included in the information collection requests; and a transmitting unit configured to acquire the information from a terminal that collects the information from the sensor on a basis of the schedule and transmits the information to each server of the plurality of servers, wherein the access timing information differs in frequency and time of the accessible timing to the terminal in accordance with a difference in a platform and a priority of the terminal, and wherein the receiving unit, the schedule generating unit, and the transmitting unit are each implemented via at least one processor.

12. A terminal device, comprising:

a sensor information acquiring unit configured to acquire information from a sensor of a plurality of sensors; and a transmitting unit configured to
transmit the information to a plurality of servers in accordance with a schedule generated by a terminal management device on a basis of priorities of access to the terminal device required to collect information from the plurality of sensors and included in information collection requests obtained from a plurality of servers that search for the information, and
transmit access timing information related to an accessible timing of another device that desires to obtain the information to the terminal management device, wherein the access timing information differs in frequency and time of the accessible timing to the terminal device in accordance with a difference in a platform and a priority of the terminal device, and wherein the sensor information acquiring unit and the transmitting unit are each implemented via at least one processor.

13. A terminal management device, comprising:

a receiving unit configured to
receive information collection requests from a plurality of servers, each server having a search function, and
receive, from a terminal that collects information from a sensor, access timing information related to an accessible timing to the terminal;

a schedule generating unit configured to generate a schedule for the plurality of servers to acquire information from a terminal that collects the information from a sensor of a plurality of sensors on a basis of priorities of access to the terminal required to collect information from the plurality of sensors and included in the information collection requests; and a transmitting unit configured to transmit the schedule to the plurality of servers, wherein the access timing information differs in frequency and time of the accessible timing to the terminal in accordance with a difference in a platform and a priority of the terminal, and wherein the receiving unit, the schedule generating unit, and the transmitting unit are each implemented via at least one processor.

14. A terminal device, comprising:

a sensor information acquiring unit configured to acquire information from a sensor; and a transmitting unit configured to
transmit, to a terminal management device, information commonly included in information collection requests received by the terminal management device from a plurality of servers that search for the information, calculated by the terminal management device based on a greatest common divisor of data desired to be collected by the information collection requests, and
transmit access timing information related to an accessible timing of another device that desires to obtain the information to the terminal management device, wherein the access timing information differs in frequency and time of the accessible timing to the terminal device in accordance with a difference in a platform and a priority of the terminal device, and wherein the sensor information acquiring unit and the transmitting unit are each implemented via at least one processor.

15. A terminal management device, comprising:

a receiving unit configured to
receive information collection requests from a plurality of servers having a search function, and
receive, from a terminal that collects information from a sensor, access timing information related to an accessible timing to the terminal;

a common part calculating unit configured to calculate a common part of the information collection requests received from the plurality of servers based on a greatest common divisor of data desired to be collected by the information collection requests; and a transmitting unit configured to acquire data related to the common part from the terminal and transmits the data to each of the plurality of servers, wherein the access timing information differs in frequency and time of the accessible timing to the terminal in accordance with a difference in a platform and a priority of the terminal, and wherein the receiving unit, the common part calculating unit, and the transmitting unit are each implemented via at least one processor.

16. A terminal device, comprising:

a sensor information acquiring unit configured to acquire information from a sensor;

a tag information generating unit configured to generate tag information identifying the information; and a transmitting unit configured to
transmit the tag information and access timing information related to an accessible timing of another device that desires to obtain the information to a terminal management device, and
transmit access timing information related to an accessible timing of another device that desires to obtain the information to a terminal management device, wherein the access timing information differs in frequency and time of the accessible timing to the terminal device in accordance with a difference in a platform and a priority of the terminal device, wherein the accessible timing to a terminal occurs a first number of times within a period of time in a first frequency and the accessible timing to the terminal occurs a second number of times within the period of time in a second frequency, the second number of times being higher than the first number of times, and wherein the sensor information acquiring unit, the tag information generating unit, and the transmitting unit are each implemented via at least one processor.

17. A terminal management device, comprising:
a receiving unit configured to
   receive, from a terminal that collects information from a sensor, access timing information related to an accessible timing to the terminal, and
   receive, from the terminal, access timing information related to an accessible timing to the terminal;
a tag information acquiring unit configured to acquire tag information identifying information from a terminal that acquires the information from a sensor within a period of time of a wake up time at which the sensor is being activated; and
a transmitting unit configured to transmit the tag information to a server that searches for the information, wherein the access timing information differs in frequency and time of the accessible timing to the terminal in accordance with a difference in a platform and a priority of the terminal, wherein the accessible timing to the terminal occurs a first number of times within a period of time in a first frequency and the accessible timing to the terminal occurs a second number of times within the period of time in a second frequency, the second number of times being higher than the first number of times, and wherein the receiving unit, the tag information acquiring unit, and the transmitting unit are each implemented via at least one processor.

18. A terminal management device, comprising:
a receiving unit configured to receive an information request for capabilities of the terminal management device configured to manage access to a terminal that collects information from a sensor from a server having a search function; and
a transmitting unit configured to transmit the capabilities of the terminal management device by transmitting a device class representing at least two of the capabilities defined by capability numbers 1-5 to the server in response to the information request, a first device class representing all of the capability numbers 1-5 and a second device class representing less than all of the capability numbers 1-5 such that capability number 1 is a function of notifying an accessible time for each priority of the terminal, capability number 2 is a function of disclosing data collection plan information of the terminal, capability number 3 is s function of disclosing progress of data collection of the terminal, and capability number 5 is a function of adjusting access to the terminal for each priority, wherein the receiving unit and the transmitting unit are each implemented via at least one processor.

* * * * *